(12) United States Patent
Yamazaki

(10) Patent No.: US 10,593,244 B2
(45) Date of Patent: Mar. 17, 2020

(54) ELECTRO-OPTICAL DEVICE AND ELECTRONIC APPARATUS

(71) Applicant: SEIKO EPSON CORPORATION, Tokyo (JP)

(72) Inventor: Tetsuro Yamazaki, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/002,238

(22) Filed: Jun. 7, 2018

(65) Prior Publication Data

US 2018/0374406 A1  Dec. 27, 2018

(30) Foreign Application Priority Data

Jun. 21, 2017  (JP) .................................. 2017-121449

(51) Int. Cl.
| | |
|---|---|
| *G09G 3/00* | (2006.01) |
| *G09G 3/20* | (2006.01) |
| *G09G 3/36* | (2006.01) |
| *G06T 3/40* | (2006.01) |

(52) U.S. Cl.
CPC ........... *G09G 3/007* (2013.01); *G06T 3/4069* (2013.01); *G09G 3/2022* (2013.01); *G09G 3/2092* (2013.01); *G09G 3/3607* (2013.01); *G09G 2340/0457* (2013.01)

(58) Field of Classification Search
CPC ..... G09G 3/007; G09G 3/3607; G09G 3/2092; G09G 3/2022; G09G 2340/0457; G06T 3/4069
See application file for complete search history.

(56) References Cited

U.S. PATENT DOCUMENTS

2016/0366383 A1* 12/2016 Nishimori ............ H04N 9/3188

FOREIGN PATENT DOCUMENTS

| JP | 2015-031778 A | 2/2015 |
|---|---|---|
| JP | 2017-003926 A | 1/2017 |

* cited by examiner

*Primary Examiner* — Aneeta Yodichkas
(74) *Attorney, Agent, or Firm* — Oliff PLC

(57) ABSTRACT

An electro-optical device includes an optical path shift element that changes a path of light by a first and second period including α SFs; a determining unit that determines whether or not a difference between a first gradation displayed for the first period and a second gradation displayed for the second period is larger than a threshold value; and a designation signal generating unit that generates a designation signal designating an on or off-state of the pixel for the SFs, in a case where a result of the determination is negative, the designation signal designates the on or off-state of the pixel so that the pixel displays a display gradation for the first and second period based on at least one of the first and second gradation, and each of the first, second, and display gradation is a gradation expressible by the on or off-state for the 2α SFs.

6 Claims, 22 Drawing Sheets

FIG. 10

| GRADATION LEVEL | VALUE OF EACH OF sf PERIODS | | | | SF CODE |
|---|---|---|---|---|---|
| | c1 | c2 | c3 | c4 | |
| 0 | 0 | 0 | 0 | 0 | Cds[0] |
| 2 | 0 | 0 | 1 | 0 | Cds[1] |
| 4 | 0 | 1 | 1 | 0 | Cds[2] |
| 6 | 1 | 1 | 1 | 0 | Cds[3] |

FIG. 11

| GRADATION LEVEL | VALUE OF EACH OF sf PERIODS | | | | | | | | SF CODE |
|---|---|---|---|---|---|---|---|---|---|
| | c1 | c2 | c3 | c4 | c5 | c6 | c7 | c8 | |
| 0 | 0 | 0 | 0 | 0 | 0 | 0 | 0 | 0 | Cdl[0] |
| 1 | 0 | 0 | 0 | 0 | 0 | 0 | 1 | 0 | Cdl[1] |
| 2 | 0 | 0 | 1 | 0 | 0 | 0 | 1 | 0 | Cdl[2] |
| 3 | 0 | 0 | 1 | 0 | 0 | 0 | 1 | 1 | Cdl[3] |
| 4 | 0 | 1 | 1 | 0 | 0 | 1 | 1 | 0 | Cdl[4] |
| 5 | 1 | 1 | 1 | 0 | 0 | 1 | 1 | 0 | Cdl[5] |
| 6 | 1 | 1 | 1 | 0 | 1 | 1 | 1 | 0 | Cdl[6] |
| 7 | 1 | 1 | 1 | 1 | 1 | 1 | 1 | 1 | Cdl[7] |

ELECTRO-OPTICAL DEVICE AND ELECTRONIC APPARATUS

BACKGROUND

1. Technical Field

The present invention relates to an electro-optical device and an electronic apparatus.

2. Related Art

As a driving method of a liquid crystal element included in an electro-optical device, a so-called subfield driving method is known (for example, JP-A-2015-31778). In the subfield driving method, by dividing a display period into a plurality of subfields and applying on-state voltage or off-state voltage to a pixel in each of the subfields, a gradation level displayed by the pixel is controlled for the display period.

In addition, as a technology of spuriously increasing resolution of a liquid crystal panel included in a projection type of an electro-optical device such as a projector, a technology related to so-called pixel shift is known (for example, JP-A-2017-3926). In the pixel shift technology, a display period is divided into unit periods equal to or more than two which respectively include a subfield or subfields equal to or more than two. Then, a position of light projected onto a screen via a pixel is changed by the unit period. Accordingly, it is possible to spuriously improve resolution of an image displayed on the screen.

The technology related to the pixel shift may be applied to the electro-optical device driven by the subfield driving method so as to increase the resolution of the liquid crystal panel. However, in a case of applying the technology related to the pixel shift, the gradation level of the pixel is controlled for a unit period having subfields smaller than the number of the subfields included in the display period. For this reason, in the case of applying the technology related to the pixel shift, the number of the gradation levels expressible by the pixel is decreased as compared with a case of not applying the technology related to the pixel shift.

SUMMARY

An advantage of some aspects of the invention is to suppress decrease of the number of the gradation levels expressible by the pixel in a case where the technology related to the pixel shift is applied to the electro-optical device using the subfield driving method.

According to an aspect of the invention, there is provided an electro-optical device including: an optical path shift element that changes an optical path of light so that a region which the light emitted via a pixel reaches for a first unit period including α subfields (α is a natural number satisfying 1≤α) is different from a region which the light reaches for a second unit period including subfields; a determining unit that determines whether or not a difference between a first gradation level to be displayed by the pixel for the first unit period and a second gradation level to be displayed by the pixel for the second unit period is larger than a predetermined threshold value; and a designation signal generating unit that generates a designation signal designating an on-state or an off-state of the pixel for each of a plurality of the subfields, in which in a case where a result of the determination is negative, the designation signal designates the on-state or the off-state of the pixel so that the pixel displays a display gradation level for the first unit period and the second unit period based on at least one of the first gradation level and the second gradation level, and each of the first gradation level, the second gradation level, and the display gradation level is a gradation level expressible by the on-state or the off-state of the pixel for each of the 2α subfields.

In addition, it is preferable that there be provided an electro-optical device including: an optical path shift element that changes an optical path of light so that a region which the light emitted via a pixel reaches for a first unit period including α subfields is different from a region which the light reaches for a second unit period including α subfields; a determining unit that determines whether or not a difference between a first gradation level to be displayed by the pixel for the first unit period and a second gradation level to be displayed by the pixel for the second unit period is larger than a predetermined threshold value; and a designation signal generating unit that generates a designation signal designating an on-state or an off-state of the pixel for each of a plurality of the subfields, in which in a case where a result of the determination is negative, the designation signal designates the on-state or the off-state of the pixel so that the pixel displays the first gradation level and the second gradation level for the first unit period and the second unit period, and each of the first gradation level and the second gradation level is a gradation level expressible by the on-state or the off-state of the pixel for each of the 2α subfields.

In the invention, in a case where the difference between the first gradation level and the second gradation level is equal to or less than the predetermined threshold value, the pixel displays the gradation level expressible by the 2α subfields. For this reason, as compared with a case where the pixel displays the gradation level expressible by the α subfields, the pixel can express the gradation level of high gradation (finer gradation level). That is, according to the invention, it is possible to suppress decrease of the number of the gradation levels expressible by the pixel.

In the electro-optical device, it is preferable that in a case where the result of the determination is positive, the designation signal designate the on-state or the off-state of the pixel so that the pixel displays a third gradation level determined based on the first gradation level for the first unit period and designate the on-state or the off-state of the pixel so that the pixel displays a fourth gradation level determined based on the second gradation level for the second unit period, and each of the third gradation level and the fourth gradation level be a gradation level expressible by the on-state or the off-state of the pixel for each of the α subfields.

According to the aspect of the invention, it is possible to spuriously increase resolution of an image displayed by the electro-optical device.

In the electro-optical device, it is preferable that each of the first gradation level and the second gradation level be a gradation level of P bits (P is a natural number satisfying 2≤P), each of the third gradation level and the fourth gradation level be a gradation level of Q bits (Q is a natural number satisfying 1≤Q<P), in a case where the result of the determination by the determining unit is positive, the designation signal generating unit generate the designation signal by using first designation information designating the on-state or the off-state of the pixel for each of the α subfields when causing the pixel to display the gradation level of Q bits for the α subfields, and in a case where the result of the determination is negative, the designation signal generating unit generate the designation signal by using second designation information designating the on-state or the off-state of the pixel for each of the 2α subfields when causing the pixel to display the gradation level of P bits for the 2α subfields.

According to the aspect of the invention, since the pixel displays the gradation level of P bits in a case where pixel shift does not improve the resolution, it is possible to spuriously improve the resolution and it is also possible to suppress decrease of the number of the gradation levels expressible by the pixel.

It is preferable that the first gradation level be designated by a first image signal and the second gradation level be designated by a second image signal, and the first image signal and the second image signal be signals obtained by decreasing resolution of a video signal representing the gradation level to be displayed by the pixel for a frame period including the first unit period and the second unit period.

According to the aspect of the invention, the first gradation level and the second gradation level are determined based on the video signal. For this reason, in a case where the result of the determination by the determining unit is negative, the pixel can display the gradation level according to the video signal without decrease of the gradation.

According to another aspect of the invention, there is provided an electro-optical device including: a plurality of pixels; an optical path shift element that changes an optical path of light so that a region which the light emitted via each of the plurality of the pixels reaches for a first unit period is different from a region which the light reaches for a second unit period; and a controller that generates a designation signal designating an on-state or an off-state of the plurality of the pixels for each of a plurality of subfields based on a video signal representing a desired image having a first area and a second area, in which in a case where a difference between a first designation gradation level and a second designation gradation level is larger than a predetermined reference value when the video signal represents that the first designation gradation level of P bits (P is a natural number satisfying 2≤P) is displayed in the first area and the second designation gradation level of P bits is displayed in the second area, the plurality of the pixels include at least a pixel that displays the first designation gradation level for the first unit period and the second unit period, a pixel that displays the second designation gradation level for the first unit period and the second unit period, and a pixel that displays a third designation gradation level of Q bits (Q is a natural number satisfying 1≤Q<P) for the first unit period and displays a fourth designation gradation level of Q bits for the second unit period.

According to the aspect of the invention, the gradation level of P bits and the gradation level of Q bits which are smaller bits than P bits represented by the video signal are displayed. That is, it is possible to improve both of improvement in resolution by pixel shift and high gradation expression.

According to still another aspect of the invention, there is provided an electro-optical device including: a plurality of pixels, the pixel including a liquid crystal element; an optical path shift element that changes an optical path of light so that a region which the light emitted via each of the plurality of the pixels reaches for a first unit period is different from a region which the light reaches for a second unit period; and a controller that generates a designation signal designating an on-state or an off-state of the plurality of the pixels for each of a plurality of subfields based on a video signal representing a desired image having a first area and a second area, in which in a case where a difference between a first designation gradation level and a second designation gradation level is larger than a predetermined reference value when the video signal represents that the first designation gradation level of P bits (P is a natural number satisfying 2≤P) is displayed in the first area and the second designation gradation level of P bits is displayed in the second area, the plurality of the pixels include a first pixel, a second pixel, and a third pixel, a change in transmittance of the liquid crystal element included in the first pixel for the first unit period and the second unit period indicates a transmittance change when the first pixel displays the first designation gradation level, a change in transmittance of the liquid crystal element included in the second pixel for the first unit period and the second unit period indicates a transmittance change when the second pixel displays the second designation gradation level, a change in transmittance of the liquid crystal element included in the third pixel for the first unit period indicates a transmittance change when the third pixel displays the third designation gradation level and a change in transmittance of the liquid crystal element for the second unit period indicates a transmittance change when the third pixel displays the fourth designation gradation level, and each of the third designation gradation level and the fourth designation gradation level is a gradation level of Q bits (Q is a natural number satisfying 1≤Q<P).

According to the aspect of the invention, the gradation level of P bits and the gradation level of Q bits which are smaller bits than P bits represented by the video signal are displayed. That is, it is possible to improve both of improvement in resolution by pixel shift and high gradation expression.

In addition, according to still another aspect of the invention, there is provided an electronic apparatus including any one of the electro-optical devices described above.

BRIEF DESCRIPTION OF THE DRAWINGS

The invention will be described with reference to the accompanying drawings, wherein like numbers reference like elements.

FIG. 10 is a diagram for explaining first designation information.

FIG. 11 is a diagram for explaining second designation information.

DESCRIPTION OF EXEMPLARY EMBODIMENTS

Hereinafter, embodiments for the invention will be described with reference to drawings. However, in each of the drawings, dimensions and scale of each of units are appropriately different from actual ones. In addition, since the embodiments described below are appropriately specific examples of the invention, various technically preferable limitations are attached, but the scope of the invention is not limited thereto unless otherwise stated to limit the invention in the following description.

1. Embodiment 1.1. Configuration of Projector

A configuration example of a projector 1 (one example of "electro-optical device") according to the embodiment of the invention will be described with reference to FIGS. 1 and 2.

Figure 1:
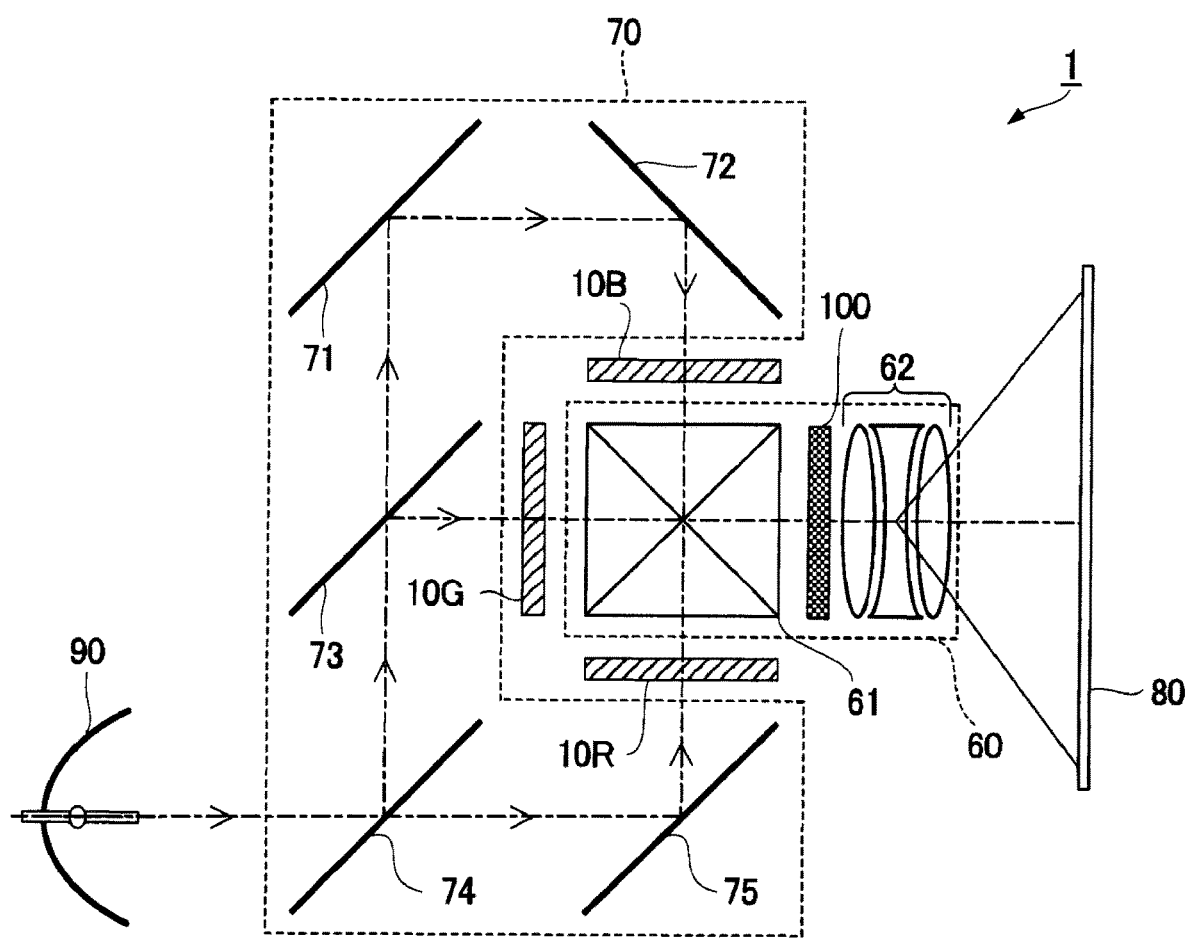
FIG. 1 is a diagram illustrating a configuration example of an optical system of a projector according to an embodiment.

FIG. 1 is a diagram illustrating the configuration example of an optical system of the projector 1. The projector 1 includes a lighting device 90, a separation optical system 70, three liquid crystal panels 10R, 10G, and 10B, and a projection optical system 60. The lighting device 90 is a white light source and, for example, a halogen lamp is used. The separation optical system 70 includes three mirrors 71, 72, and 75 and dichroic mirrors 73 and 74. The separation optical system 70 separates white light (visible light) emitted from the lighting device 90 into three primary colors of red (hereinafter, referred to as "R"), green (hereinafter, referred to as "G"), and blue (hereinafter, referred to as "B"). Specifically, the dichroic mirror 74 transmits a light beam in a wavelength range of R and reflects light beams in wavelength ranges of G and B among the white light. The dichroic mirror 73 transmits the light in the wavelength range of B and reflects the light in the wavelength range of G among the light beams in the wavelength ranges of G and B reflected by the dichroic mirror 74.

The light beams corresponding to R, G, and B separated in this manner are respectively guided to the liquid crystal panels 10R, 10G, and 10B. The liquid crystal panels 10R, 10G, and 10B are used as spatial light modulators. Hereinafter, the liquid crystal panels 10R, 10G, and 10B may be appellatively referred to as "liquid crystal panel 10".

The projection optical system 60 includes a dichroic prism 61, a projection lens system 62, and an optical path shift element 100. The light beams modulated by the liquid crystal panels 10R, 10G, and 10B are emitted to the dichroic prism 61 from three directions. In the dichroic prism 61, images of R, G, and B are synthesized and full color light is emitted.

The optical path shift element 100 and the projection lens system 62 are disposed on a side, on which the light is emitted, of the dichroic prism 61. The optical path shift element 100 is an element which shifts the incident light from one direction to the other direction or shifts the incident light from the other direction to the one direction between predetermined two directions. The projection lens system 62 enlargedly projects the light emitted from the optical path shift element 100 onto a projection surface 80.

Figure 2:
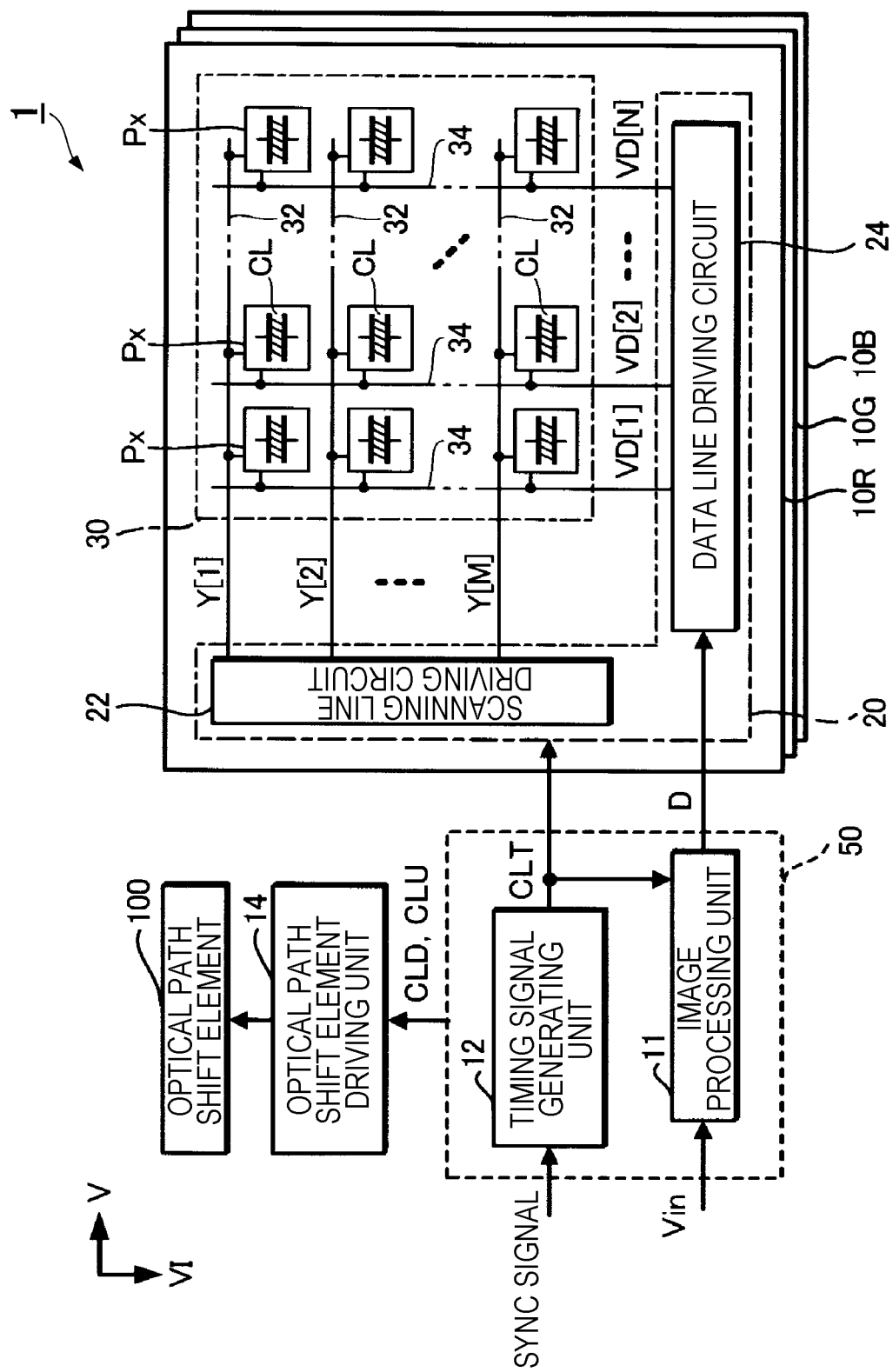
FIG. 2 is a block diagram illustrating a configuration example of a control system of the projector.

FIG. 2 is a block diagram illustrating a configuration example of a control system of the projector 1. The projector 1 includes the three liquid crystal panels 10, a controller 50, an optical path shift element driving unit 14, and the optical path shift element 100. The liquid crystal panel 10 includes a display unit 30 in which a plurality of unit pixels Px (one example of "pixel") are arranged and a driving circuit 20 which drives each of the unit pixels Px.

As illustrated in FIG. 2, in the display unit 30 of the liquid crystal panel 10, M scanning lines 32 extended in a V direction and N data lines 34 extended in a VI direction intersected with the V direction are formed (M and N are natural numbers). In the display unit 30, the plurality of the unit pixels Px are arranged in M rows by N columns corresponding to intersections of the scanning lines 32 and the data lines 34. In the present embodiment, the unit pixels Px are disposed at all of the M×N intersections for M scanning lines 32 and N data lines 34, but the unit pixels Px may be disposed at some among the M×N intersections. Resolution of the liquid crystal panel 10 is defined by the number of the unit pixels Px included in the liquid crystal panel 10.

The driving circuit 20 is a circuit which supplies a data signal VD[n] (n is a natural number satisfying $1 \leq n \leq N$) which designates a gradation level displayed by each of the unit pixels Px to a pixel circuit 40 provided in each of the unit pixels Px and includes a scanning line driving circuit 22 and a data line driving circuit 24.

The scanning line driving circuit 22 supplies a scanning signal Y[m] to the scanning line 32 of the m-th row (m is a natural number satisfying 1≤m≤M). By setting the scanning signal Y[m] to a predetermined selection potential, the scanning line driving circuit 22 selects the scanning line 32 of the m-th row.

The data line driving circuit 24 supplies the data signals VD[1] to VD[N] to the data lines 34 of the first row to the N-th row in sync with the scanning line 32 selected by the scanning line driving circuit 22. In other words, the data line driving circuit 24 supplies the data signal VD[n] to the data line of the n-th row.

Figure 3:
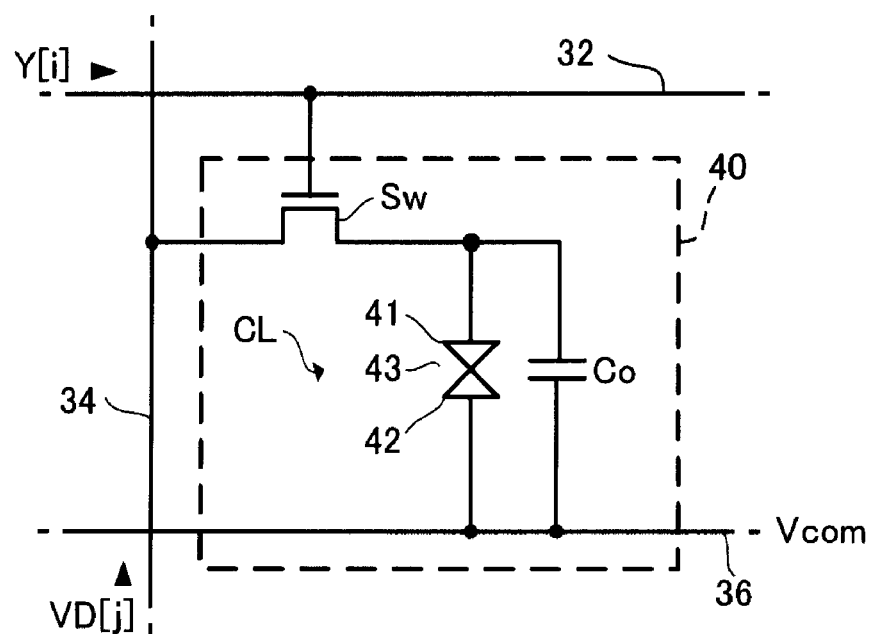
FIG. 3 is a circuit diagram of a pixel circuit.

FIG. 3 is a circuit diagram of the pixel circuit 40 corresponding to each of the unit pixels Px. As illustrated in FIG. 3, each of the pixel circuits 40 includes a liquid crystal element CL, a selection switch Sw, and a capacity Co.

The liquid crystal element CL is an electro-optical element which includes a pixel electrode 41, a common electrode 42, and a liquid crystal 43 provided between the pixel electrode 41 and the common electrode 42. When a voltage is applied to the liquid crystal element CL (that is, between the pixel electrode 41 and the common electrode 42), relative transmittance of the liquid crystal element CL is changed depending on magnitude of the applied voltage. The unit pixel Px displays the gradation level depending on the relative transmittance of the liquid crystal element CL.

Here, the relative transmittance of the liquid crystal element CL is a relative value indicating the amount of light transmitted through the liquid crystal element CL. In the present embodiment, in a state in which the voltage is not applied to the liquid crystal element CL, when the liquid crystal 43 hardly transmits the light, the amount of light transmitted through the liquid crystal element CL is set to 0%. In addition, in a state in which a maximum voltage is applied to the liquid crystal element CL, when the liquid crystal 43 easily transmits the light, the amount of light transmitted through the liquid crystal element CL is set to 100%. Hereinafter, the relative transmittance of the liquid crystal element CL is simply set to "transmittance".

In the present embodiment, the liquid crystal 43 included in the liquid crystal element CL is a vertical alignment (VA) type. As an example, there is provided a normally black mode in which the unit pixel Px displays black (relative transmittance of liquid crystal element CL is 0%) in a state where the voltage is not applied between the pixel electrode 41 and the common electrode 42.

The common electrode 42 is set to a predetermined reference voltage. One tip of the capacity Co is electrically connected with the pixel electrode 41 and the other tip of the capacity Co is electrically connected with a capacity line 36 having a constant voltage Vcom. In addition, the common electrode 42 is also electrically connected with the capacity line 36.

The selection switch Sw is, for example, an N-channel type transistor, is provided between the pixel electrode 41 and the data line 34, and controls electrical connection (conduction/insulation) between the pixel electrode 41 and the data line 34. Specifically, a gate of the selection switch Sw which is the N-channel type transistor is electrically connected with the scanning line 32. When the scanning signal Y[m] is set to the selection potential, the selection switch Sw provided in the pixel circuit 40 of the m-th row becomes an on-state. When the selection switch Sw is in the on-state, the data signal VD[n] is supplied from the data line 34 to the pixel circuit 40 and a voltage depending on the data signal VD[n] is applied to the liquid crystal element CL. Accordingly, transmittance of the liquid crystal element CL of the pixel circuit 40 is changed depending on the data signal VD[n] and the unit pixel Px corresponding to the pixel circuit 40 displays the gradation level depending on the data signal VD[n].

After the voltage depending on the data signal VD[n] is applied to the liquid crystal element CL of the pixel circuit 40, when the selection switch Sw is in an off-state, a potential in the pixel electrode 41 is held by the capacity Co. That is, in a period from when the selection switch Sw is in the on-state until when the selection switch Sw is in the off-state next, the voltage depending on the data signal VD[n] continues to be applied to the liquid crystal element CL.

Returning to the description in FIG. 2. The controller 50 includes an image processing unit 11 and a timing signal generating unit 12. The timing signal generating unit 12 generates a control signal CLT to control the driving circuit 20 and the image processing unit 11 based on a sync signal supplied from an upper device (not illustrated) and supplies the generated control signal CLT to the driving circuit 20 and the image processing unit 11. In addition, the timing signal generating unit 12 generates a control signal CLD to control the optical path shift element 100 based on the sync signal.

When a video signal Vin representing an image to be displayed by the projector 1 is supplied from the upper device, the image processing unit 11 generates a designation signal D which designates an on-state or an off-state of the unit pixel Px for each of a plurality of subfield periods sf (described below) based on the video signal Vin and the control signal CLT supplied from the timing signal generating unit 12. In addition, the image processing unit 11 generates a control signal CLU which designates whether to drive the optical path shift element 100 or not based on the video signal Vin and supplies the control signal CLU to the optical path shift element driving unit 14. The details of the video signal Vin will be described below.

The optical path shift element driving unit 14 drives the optical path shift element 100 based on the control signal CLD supplied from the timing signal generating unit 12 and the control signal CLU supplied from the image processing unit 11.

The optical path shift element 100 is driven based on a signal supplied from the optical path shift element driving unit 14. As described above, the optical path shift element 100 shifts an optical path of light emitted to the optical path shift element 100.

1.2. Operation Outline of Projector

Figure 4:
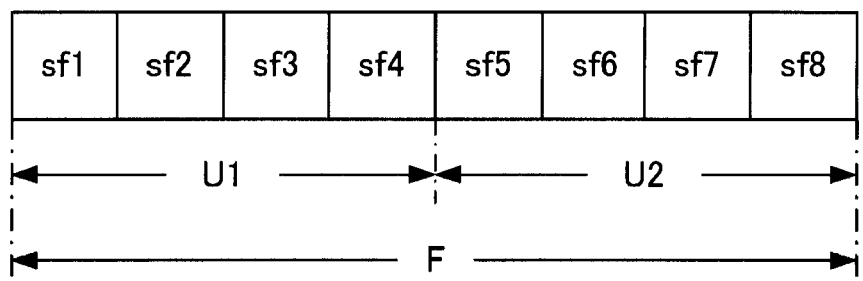
FIG. 4 is a diagram for explaining an operation period of the projector.

FIG. 4 is a diagram for explaining an operation period of the projector 1. In the present embodiment, the operation period of the projector 1 includes a plurality of frame periods F. In a case where the projector 1 displays an image, the frame period F is a period for which the unit pixel Px displays the gradation level corresponding to the image. In addition, the frame period F is determined for each of the unit pixels Px. As illustrated in FIG. 4, in the present embodiment, the frame period F is divided into a unit period U1 (one example of "first unit period") and a unit period U2 (one example of "second unit period") which have the same time lengths with each other. In addition, in the present embodiment, it is assumed that the unit period U1 is a period started at the same time as a start of the frame period F and the unit period U2 is a period followed by the unit period U1 and ended at the same time as the frame period F. Hereinafter, the unit period U1 and the unit period U2 may be appellatively referred to as "unit period U".

In the present embodiment, each of the unit periods U is divided into α subfield periods sf (α is a natural number satisfying 1≤α) having the same time lengths with one another. That is, in the present embodiment, the frame period F includes 2α subfield periods sf.

In the present embodiment, for convenience, as illustrated in FIG. 4, α is set to "4". That is, in the present embodiment, as an example, there is provided a case where one frame period F is divided into eight subfield periods sf (sf1 to sf8). More specifically, in the present embodiment, the unit period U1 includes the four subfield periods sf1 to sf4 and the unit period U2 includes the four subfield periods sf5 to sf8. In the present embodiment, it is assumed that α is set to "4", but α may be any predetermined number as long as a is α natural number satisfying 1≤α. In addition, in the present embodiment, the subfield periods sf have the same time lengths with one another, but the subfield periods sf may have time lengths different from one another.

Next, driving of the subfield according to the present embodiment will be described.

The data line driving circuit 24 supplies the data signal VD[n] to the unit pixel Px for each of the eight subfield periods sf included in the frame period F of the unit pixel Px. In the present embodiment, the data signal VD[n] is a signal which designates an on-state or an off-state of the unit pixel Px for one subfield period sf. That is, by supplying the data signal VD[n] to each of the unit pixels Px for each of the subfield periods sf, the data line driving circuit 24 designates the on-state or the off-state of each of the unit pixels Px for each of the subfield periods sf.

In a case where the data line driving circuit 24 designates the on-state of the unit pixel Px, the data signal VD[n] supplied to the unit pixel Px is set to a potential (that is, a potential at which relative transmittance of the liquid crystal element CL included in the unit pixel Px is maximized) capable of causing the unit pixel Px to display a maximum gradation level. In addition, in a case where the data line driving circuit 24 designates the off-state of the unit pixel Px, the data signal VD[n] supplied to the unit pixel Px is set to a potential (that is, a potential at which relative transmittance of the liquid crystal element CL included in the unit pixel Px is minimalized) capable of causing the unit pixel Px to display a minimum gradation level. In the present embodiment, the data signal VD[n] is set to a value designating the maximum gradation level of the unit pixel Px or a value designating the minimum gradation level, but the data signal VD[n] may be set to a value designating a middle gradation other than the maximum gradation level and the minimum gradation level. In addition, in this case, the value of the data signal VD[n] may be a different variable value for each of the subfield periods sf.

The gradation level displayed by the unit pixel Px for a predetermined period is determined by an integral value of the relative transmittance of the liquid crystal element CL included in the unit pixel Px for the predetermined period. Specifically, the gradation level displayed by the unit pixel Px for the unit period U is determined based on disposition of the subfield period sf for which the unit pixel Px is designated to be in the on-state among the four subfield periods sf included in the unit period U. For this reason, by controlling the disposition of the subfield period sf for which the unit pixel Px is designated to be in the on-state among the four subfield periods sf included in the unit period U, the projector 1 can control the gradation level displayed by the unit pixel Px for the unit period U. In the same manner, the gradation level displayed by the unit pixel Px for the frame period F is determined based on disposition of the subfield period sf for which the unit pixel Px is designated to be in the on-state among the eight subfield periods sf included in the frame period F. By controlling the disposition of the subfield period sf for which the unit pixel Px is designated to be in the on-state among the eight subfield periods sf included in the frame period F, the projector 1 can control the gradation level displayed by the unit pixel Px for the frame period F.

As described above, as the number of patterns of the disposition of the subfield period sf for which the unit pixel Px is designated to be in the on-state in the subfield periods sf included in a predetermined period is increased, types of the gradation level expressible for the predetermined period. In addition, as the number of the subfield periods sf included in the predetermined period is increased, the number of the patterns is increased. In the present embodiment, the frame period F includes the 2α subfield periods sf and the unit period U includes the α subfield periods sf. Therefore, the number of types of the gradation level expressible by the unit pixel Px for the frame period F is larger than the number of types of the gradation level expressible by the unit pixel Px for the unit period U.

Hereinafter, the gradation level, expressible by designating the on-state or the off-state of the unit pixel Px for each of the W subfield periods sf (W is a natural number), may be expressed to as "gradation level expressible by W subfield periods sf".

Figure 5:
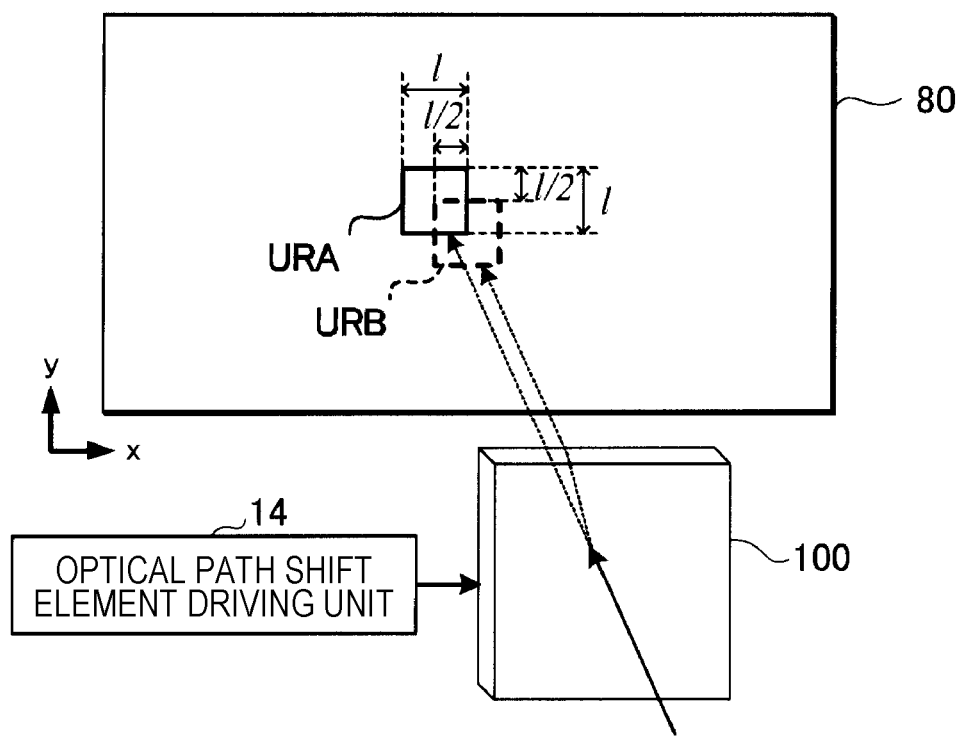
FIG. 5 is a diagram for explaining an operation of an optical path shift element.

Next, an operation of the optical path shift element 100 will be described with reference to FIG. 5. FIG. 5 is a diagram for explaining the operation of the optical path shift element 100. The projector 1 according to the present embodiment can spuriously increase the resolution of the liquid crystal panel 10 by using the optical path shift element 100.

As described above, the optical path shift element 100 shifts the optical path of incident light in one direction of two predetermined directions and emits the incident light. More specifically, the optical path shift element 100 changes the optical path of the light emitted from the lighting device 90 via each of the plurality of the unit pixels Px so that a region (hereinafter, referred to as "unit region URA") which the light reaches for the unit period U1 is different from a region (hereinafter, referred to as "unit region URB") which the light reaches for the unit period U2. As a result, on the projection surface 80 such as a screen, a region on which the light is projected via each of the unit pixels Px for the unit period U1 is different from a region on which the light is projected via each of the unit pixels Px for the unit period U2. Hereinafter, the unit region URA and the unit region URB may be appellatively referred to as "unit region UR".

FIG. 5 illustrates an example of the unit region URA and the unit region URB on the projection surface 80. In the example in FIG. 5, the unit region URB is a region obtained by moving the unit region URA by a distance of ½ of the unit pixel Px in a +x direction and in a −y direction on the projection surface 80. As illustrated in FIG. 5, a part of the unit region URA and a part of the unit region URB overlap with each other. In the present embodiment, the example in which the unit region URA is a square shape is illustrated, but other shapes such as a rectangle shape may be used. In addition, in the present embodiment, the unit region URA is moved by the distance of ½ of the unit pixel Px, but the unit region URA may be moved by any predetermined distance as long as the distance is shorter than one unit pixel Px.

As described above, by executing a shift process (hereinafter, referred to as "pixel shift process") on the region onto which the light is projected, the number of visible pixels becomes larger than the number of the unit pixels Px actually included in the liquid crystal panel 10. For this reason, the projector 1 can spuriously increase resolution of the image projected onto the projection surface 80 than resolution of the liquid crystal panel 10. The optical path shift element 100 may have a mechanical configuration or a liquid crystal type configuration.

1.3. Detail Operation of Projector

Hereinafter, a detail operation of the projector 1 will be described.

Figure 6:
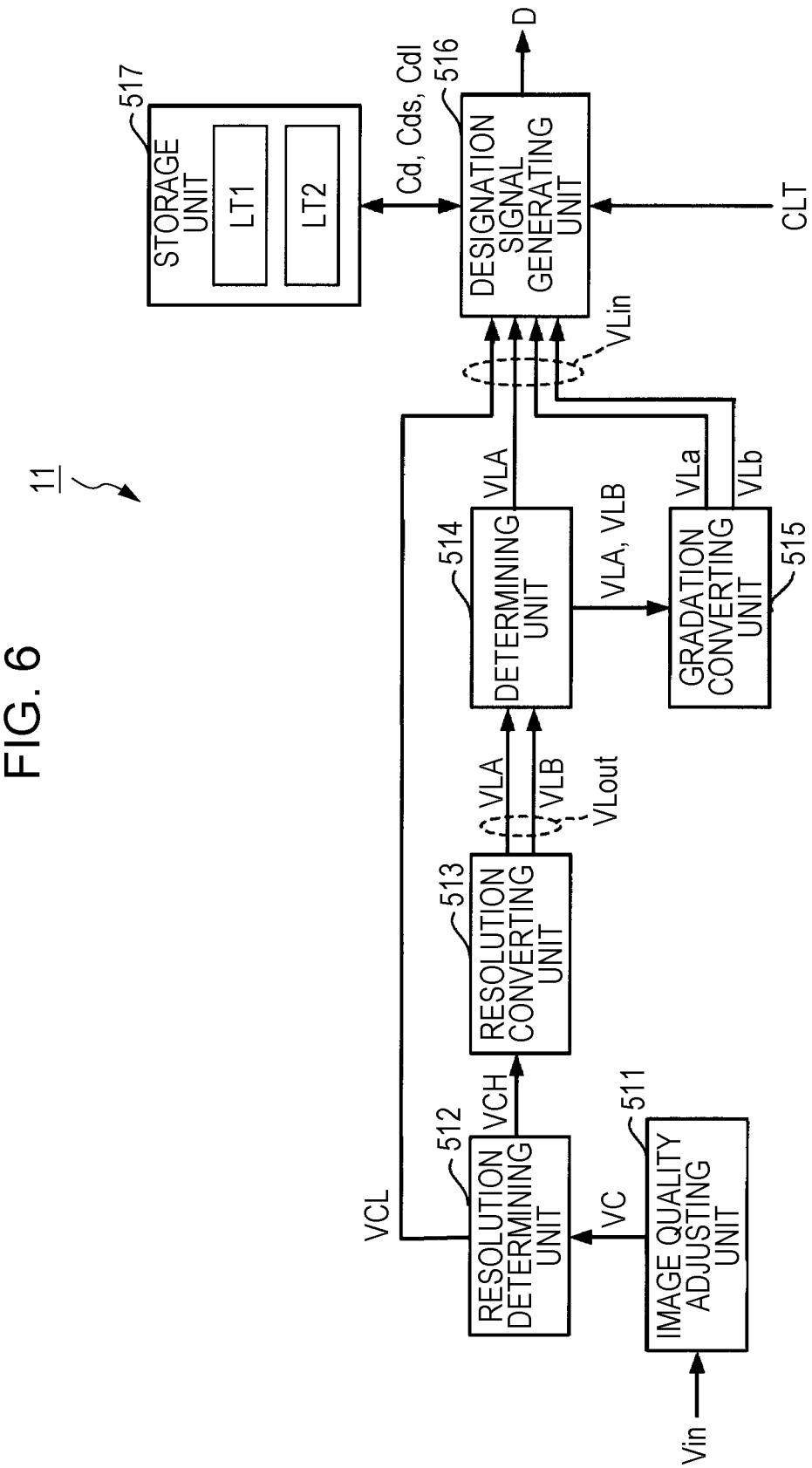
FIG. 6 is a block diagram illustrating a configuration of an image processing unit.

FIG. 6 is a block diagram illustrating a configuration example of the image processing unit 11. As illustrated in FIG. 6, the image processing unit 11 includes an image quality adjusting unit 511 which generates an image signal VC based on the video signal Vin, a resolution determining unit 512 which determines whether or not resolution indicated by the image signal VC is higher than predetermined resolution, a resolution converting unit 513 which decreases resolution of the image signal VC to generate an image signal VLA (one example of "first image signal") and an image signal VLB (one example of "second image signal"), a determining unit 514 which determines whether or not a difference between a gradation level Lv1 (one example of "first gradation level") designated by the image signal VLA and a gradation level Lv2 (one example of "second gradation level") designated by the image signal VLB is larger than a predetermined threshold value TH, a gradation converting unit 515 which converts the image signal VLA and the image signal VLB into low gradation, a designation signal generating unit 516 which generates the designation signal D based on an image signal VLin, and a storage unit 517 which stores a lookup table LT1 and a lookup table LT2.

In FIG. 6, for convenience, a state in which signals are received and transmitted between configuration elements is illustrated. In order to receive and transmit the signals between the configuration elements, the configuration element may store information indicating the generated signal in the storage unit 517 and read the information indicating the signal from the storage unit 517 according to a request of another configuration element.

When the video signal Vin is supplied from the upper device, the image quality adjusting unit 511 adjusts properties such as brightness of an image (hereinafter, referred to as "desired image Min") represented by the video signal Vin according to display properties of the liquid crystal panel 10 and generates the image signal VC. The video signal Vin is a signal which represents the image to be displayed by the plurality of the unit pixels Px. More specifically, in the present embodiment, the video signal Vin is digital data which represents the gradation level of P bits (P is a natural number satisfying 2≤P) to be displayed by each of the unit pixels Px for the frame period F. In the present embodiment, as an example, there is provided a case where the video signal Vin represents the gradation level of 3 bits (P=3). More specifically, in the present embodiment, the video signal Vin represents the gradation level to be displayed with eight stages (that is, 3 bits) from "0" to "7". The number of the bits (number instead of P) is an example and another predetermined number may be used.

In the same manner as the video signal Vin, the image signal VC represents the gradation level of P bits (3 bits in this embodiment). More specifically, the image signal VC expresses the image generated based on the video signal Vin and the pixel included in the image represents the gradation level of P bits.

Hereinafter, the image expressed by the image signal VC is referred to as "adjusted image Mv". In addition, the pixel included in the desired image Min and the adjusted image Mv may be referred to as "desired pixel Pv" and the gradation level represented by the video signal Vin and the image signal VC is referred to as "gradation level Lvin".

In the present embodiment, resolution of the adjusted image Mv may exceed resolution of the liquid crystal panel 10. Hereinafter, in a case where the resolution of the adjusted image Mv exceeds the resolution of the liquid crystal panel 10, the image signal VC expressing the adjusted image Mv is referred to as "image signal VCH". In addition, in a case where the resolution of the adjusted image Mv is equal to or less than the resolution of the liquid crystal panel 10, the image signal VC expressing the adjusted image Mv is referred to as "image signal VCL".

In the present embodiment, it is assumed that the adjusted image Mv expressed by the image signal VCH has four times the resolution of the liquid crystal panel 10. That is, in the present embodiment, it is assumed that one unit pixel Px corresponds to the four desired pixels Pv. More specifically, in the present embodiment, while the liquid crystal panel 10 has the M×N unit pixels Px, the adjusted image Mv has the 2M×2N desired pixels Pv. That is, the image (adjusted image Mv) represented by the image signal VCH corresponds to the 2M×2N desired pixels Pv and the image represented by the image signal VLA (or the image signal VLB) corresponds to the M×N unit pixels Px.

Figure 7:
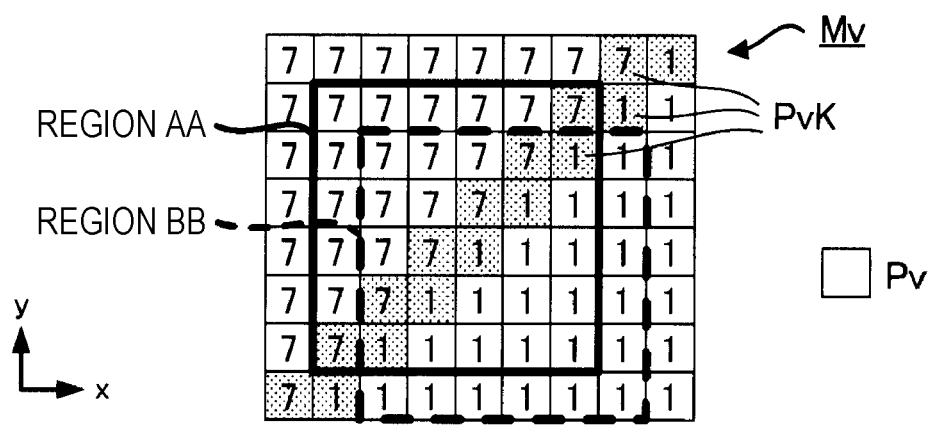
FIG. 7 is a diagram illustrating an example of an adjusted image.

FIG. 7 is a diagram illustrating an example of the adjusted image Mv. In FIG. 7, a number appended to each of the desired pixels Pv denotes an example of the gradation level Lvin represented by the desired pixel Pv. In a case where a difference (which is an absolute value and hereinafter, may be referred to as "gradation level difference between adjacent desired pixels Pv") between a gradation level represented by one desired pixel Pv and a gradation level represented by another desired pixel Pv adjacent to the desired pixel Pv in the x direction or in the y direction among the desired pixels Pv included in the adjusted image Mv is larger than a predetermined reference value TL, these desired pixel Pv and adjacent desired pixel Pv may be referred to as "boundary pixel PvK". In addition, hereinafter, the desired pixel Pv other than the boundary pixel PvK among the desired pixels Pv included in the adjusted image My may be referred to as "non-boundary pixel PvH".

In the present embodiment, it is assumed that the predetermined reference value TL is "0". For this reason, in the present embodiment, a difference (gradation level difference) of the gradation levels between the gradation level of "7" and the gradation level "1" is larger than the predetermined reference value TL. In the present embodiment, one desired pixel Pv representing the gradation level of "7" and another desired pixel Pv, adjacent to the desired pixel Pv in the x direction or in the y direction, representing the gradation level of "1" correspond to the boundary pixels PvK. In FIG. 7, hatching is attached to the boundary pixel PvK.

In the present embodiment, for convenience, as illustrated in FIG. 7, the gradation level Lvin expressed by the video signal Vin and the image signal VC is configured to have two types of the gradation levels. Hereinafter, the two types of the gradation levels expressed by the video signal Vin and the image signal VC may be referred to as "designation gradation level LvS1" (one example of "first designation gradation level") and "designation gradation level LvS2" (one example of "second designation gradation level"). For example, in FIG. 7, the gradation level of "7" is an example of the designation gradation level LvS1 and the gradation level of "1" is an example of the designation gradation level LvS2.

The resolution determining unit 512 determines whether or not the resolution of the adjusted image My exceeds the resolution of the liquid crystal panel 10 based on, for example, a frequency of the image signal VC. That is, the resolution determining unit 512 determines whether or not the image signal VC is the image signal VCH.

The resolution converting unit 513 generates the image signal VLA and the image signal VLB based on the image signal VCH. More specifically, the resolution converting unit 513 decreases the resolution of the image signal VCH to generate the image signal VLA and the image signal VLB. Hereinafter, a process in which the resolution converting unit 513 decreases the resolution may be referred to as "low resolution process".

The image signal VLA is data which designates the gradation level Lv1 of P bits to be displayed by the unit pixel Px for the unit period U1. The image signal VLB is data which designates the gradation level Lv2 of P bits to be displayed by the unit pixel Px for the unit period U2. The gradation level Lv1 and the gradation level Lv2 are determined based on the gradation level Lvin represented by the video signal Vin.

Hereinafter, the image signal VLA and the image signal VLB output by the resolution converting unit 513 may be appellatively referred to as "image signal VLout".

Figure 8:
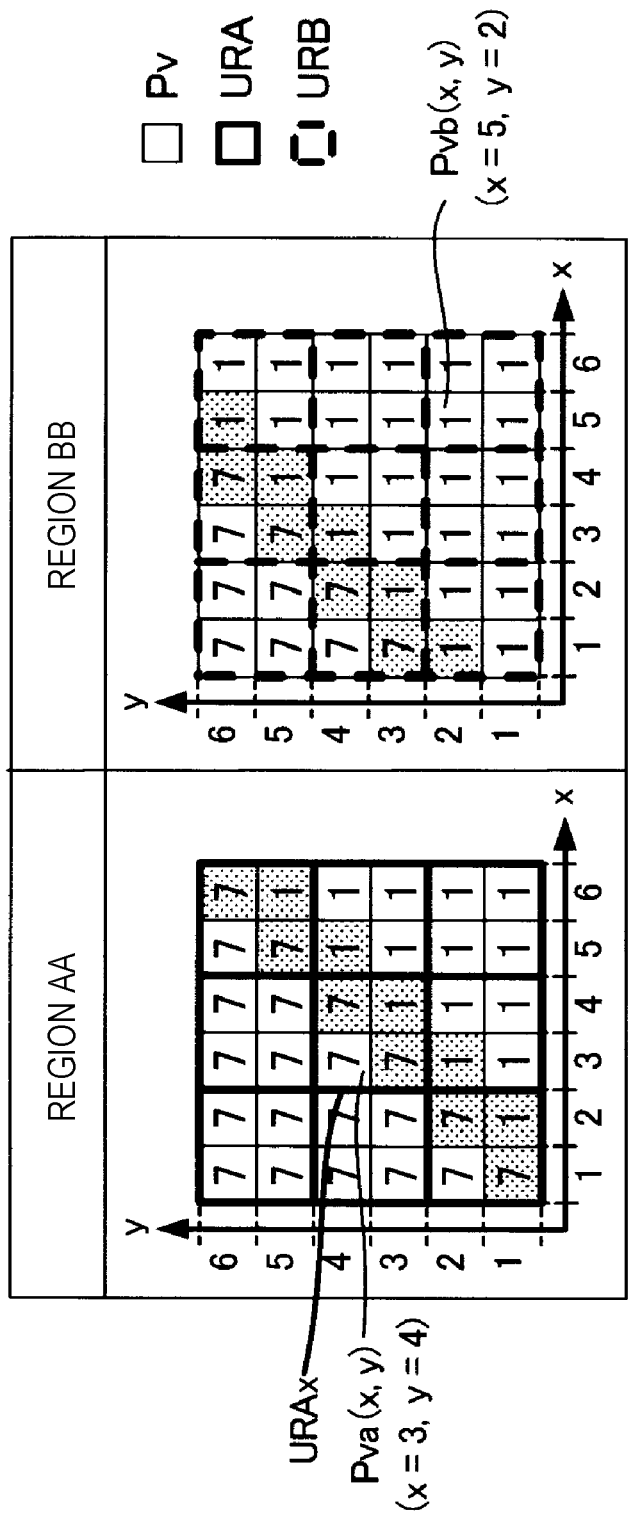
FIG. 8 is a diagram illustrating an example of a step of a low resolution process.
Figure 9:
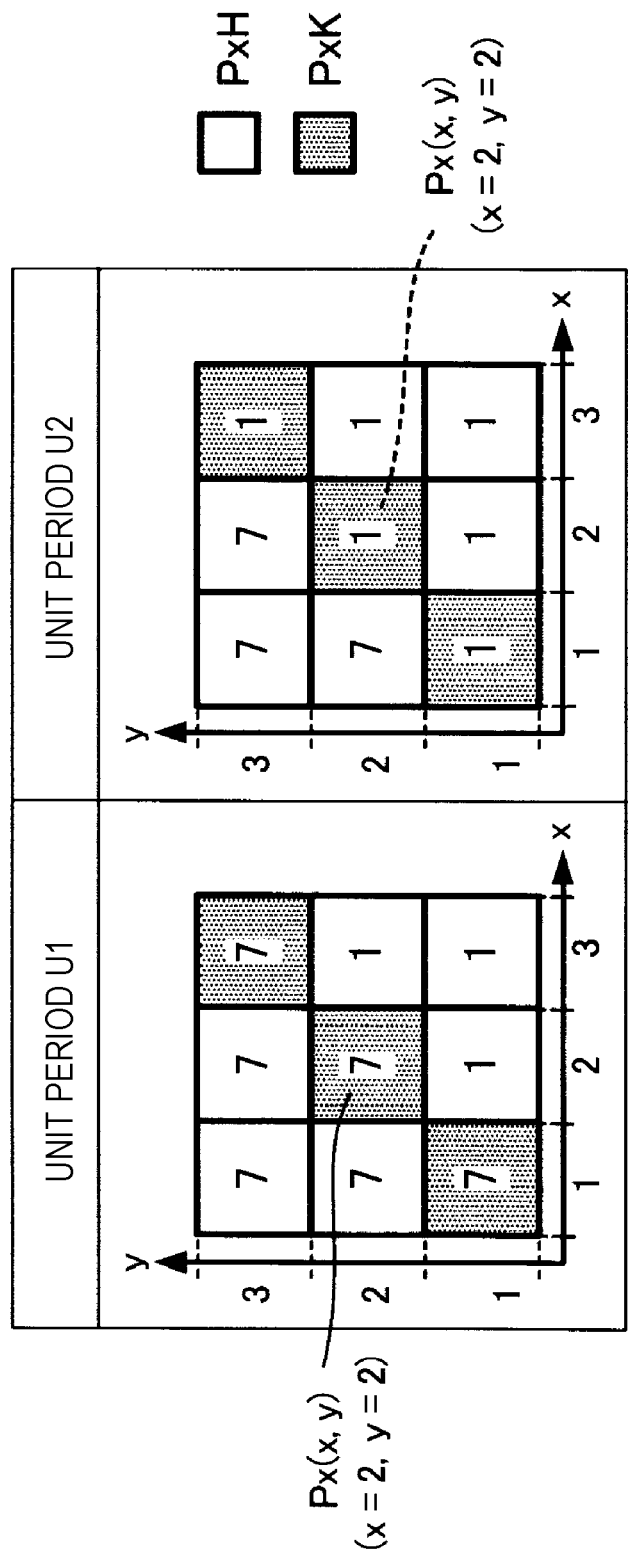
FIG. 9 is a diagram illustrating another example of the step of the low resolution process.

An example of the low resolution process by the resolution converting unit 513 will be described with reference to FIGS. 7 to 9. FIGS. 8 and 9 are diagrams for explaining steps of the low resolution process. In the same manner as FIG. 7, in FIG. 8, the desired pixel Pv denoted by hatching represents the boundary pixel PvK.

A region AA and a region BB illustrated in FIGS. 7 and 8 are respectively examples of regions included in the adjusted image Mv. As illustrated in FIG. 8, each of the region AA and the region BB includes the 36 desired pixels Pv in 6 rows by 6 columns. As illustrated in FIG. 8, hereinafter, the 36 desired pixels Pv included in the region AA may be denoted by Pva(x, y) and the 36 desired pixels Pv included in the region BB may be denoted by Pvb(x, y). In addition, Pva(x, y) and Pvb(x, y) may be appellatively referred to as "Pv(x, y)". In FIG. 8, x is a natural number satisfying $1 \le x \le 6$ and y is a natural number satisfying $1 \le y \le 6$.

In addition, in FIG. 8, a number appended to each of the desired pixels Pv denotes the gradation level represented by the desired pixel Pv. For example, in the example in FIG. 8, a desired pixel Pva (3, 4) denotes the gradation level of "7" and a desired pixel Pvb (5, 2) denotes the gradation level of "1".

As described above, in the present embodiment, the four desired pixels Pv correspond to one unit pixel Px and the unit pixel Px corresponds to the unit region URA and the unit region URB. Therefore, the region AA corresponds to the nine unit regions URA and the region BB corresponds to the nine unit regions URB. In FIG. 8, the nine unit regions URA in three rows by three columns corresponding to the region AA are denoted by thick solid lines and the nine unit regions URB in three rows by three columns corresponding to the region BB are denoted by thick dotted lines.

FIG. 9 illustrates an example of the gradation level Lv1 to be displayed by the nine unit pixels Px corresponding to the nine unit regions URA of the region AA and the nine unit regions URB of the region BB for the unit period U1 and the gradation level Lv2 to be displayed by the nine unit pixels Px for the unit period U2. As illustrated in FIG. 9, hereinafter, the nine unit pixels Px may be denoted by Px(x, y). In FIG. 9, x is a natural number satisfying $1 \le x \le 3$ and y is a natural number satisfying $1 \le y \le 3$.

In FIG. 9, a number appended to each of the unit pixels Px denotes the gradation level to be displayed by the unit pixel Pv for each of the unit periods U. The gradation level to be displayed by the unit pixel Px for the unit period U1 is the gradation level Lv1 of P bits designated by the image signal VLA generated for the unit pixel Px. In addition, the gradation level to be displayed by the unit pixel Px for the unit period U2 is the gradation level Lv2 of P bits designated by the image signal VLB generated for the unit pixel Px. The gradation level illustrated in FIG. 9 is an example and another predetermined gradation level may be used.

The gradation level designated by the image signal VLA corresponding to each of the unit pixels Px illustrated in FIG. 9 is determined based on the four gradation levels represented by the four desired pixels Pv of the unit region URA corresponding to the unit pixel Px. In addition, the gradation level designated by the image signal VLB corresponding to each of the unit pixels Px illustrated in FIG. 9 is determined based on the four gradation levels represented by the four desired pixels Pv of the unit region URB corresponding to the unit pixel Px. That is, in FIG. 9, one gradation level Lv1 designated by the image signal VLA is determined based on the four gradation levels represented by the four desired pixels Pv of the unit region URA and one gradation level Lv2 designated by the image signal VLB is determined based on the four gradation levels represented by the four desired pixels Pv of the unit region URB. The image signal VLA and the image signal VLB are signals which decrease the resolution of the image signal VCH to ¼.

In the present embodiment, by focusing on one gradation level among the four gradation levels represented by the four desired pixels Pv of the unit region URA, the gradation level is adopted as the gradation level designated by the image signal VLA of one unit pixel Px corresponding to the four desired pixels Pv. In the same manner, by focusing on one gradation level among the four gradation levels represented by the four desired pixels Pv of the unit region URB, the gradation level is adopted as the gradation level designated by the image signal VLB of one unit pixel Px corresponding to the four desired pixels Pv.

That is, in the low resolution process according to the present embodiment, it is assumed that in a case where the gradation level Lvin expressed by the video signal Vin and the image signal VC is any one of the designation gradation level LvS1 of P bits (for example, "7") and the designation gradation level LvS2 of P bits (for example, "1"), the gradation level expressed by the image signal VLA and the image signal VLB generated by the low resolution process is also any one of the designation gradation level LvS1 of P bits and the designation gradation level LvS2 of P bits.

In the present embodiment, as an example, it is assumed that the gradation level of the desired pixel Pv having coordinates in which a value of x is minimum and a value of y is maximum among the four desired pixels Pv corresponding to the unit region UR is adopted as the gradation level of the image signal (VLA or VLB) corresponding to the unit region UR.

For example, FIG. 8 focuses on the unit region URA (referred to as "unit region URAx") corresponding to the desired pixel Pva (3, 4), the desired pixel Pva (4, 4), the desired pixel Pva (3, 3), and the desired pixel Pva (4, 3). In FIG. 9, the unit region URAx corresponds to the unit pixel Px (2, 2). The desired pixel Pv having coordinates in which a value of x is minimum and a value of y is maximum among the four desired pixels Pv corresponding to the unit region URAx is the desired pixel Pva (3, 4). For this reason, the gradation level of "7" represented by the desired pixel Pva (3, 4) among the four gradation levels represented by the four desired pixels Pv corresponding to the unit region URAx is adopted as the gradation level of the image signal VLA of the unit pixel Px (2, 2) in FIG. 9.

As illustrated in FIG. 9, the image signal VLA and the image signal VLB corresponding to each of the unit pixels Px may designate different gradation levels. For example, while the image signal VLA corresponding to the unit pixel Px (2, 2) described above as the example designates the gradation level of "7", the image signal VLB corresponding to the unit pixel Px (2, 2) designates the gradation level of "1". On the other hand, the image signal VLA and the image signal VLB corresponding to each of the unit pixels Px may also designate the same gradation levels. For example, the image signal VLA and the image signal VLB corresponding to the unit pixel Px (1, 3) also designate the gradation level of "7". In addition, the image signal VLA and the image signal VLB corresponding to the unit pixel Px (3, 1) also designate the gradation level of "1".

As described above, in the low resolution process, the resolution converting unit 513 generates the image signal VLA and the image signal VLB having the resolution matching to the resolution of the liquid crystal panel 10 based on the image signal VCH.

The determining unit 514 determines whether or not a difference (absolute value) between the gradation level Lv1 designated by the image signal VLA and the gradation level Lv2 designated by the image signal VLB is larger than the predetermined threshold value TH. In the present embodiment, for example, the threshold value TH is set to "0" (zero). That is, in the present embodiment, the determining unit 514 determines whether or not the gradation level Lv1 is equal to the gradation level Lv2.

Hereinafter, in a case where a determination result of the determining unit 514 is positive, the unit pixel Px corresponding to the image signal VLA and the image signal VLB related to the determination result is referred to as "edge pixel PxK" and in a case where the determination result of the determining unit 514 is negative, the unit pixel Px corresponding to the image signal VLA and the image signal VLB related to the determination result is referred to as "non-edge pixel PxH".

In FIG. 9, hatching is attached to the unit pixel Px corresponding to the edge pixel PxK. For example, the unit pixel Px corresponding to the image signal VLA designating "7" and the image signal VLB designating "1" corresponds to the edge pixel PxK. The unit pixel Px (2, 2) described with reference to FIG. 9 is the edge pixel PxK. In addition, the unit pixel Px corresponding to the image signal VLA designating "7" and the image signal VLB designating "7" corresponds to the non-edge pixel PxH. Further, the unit pixel Px corresponding to the image signal VLA designating "1" and the image signal VLB designating "1" corresponds to the non-edge pixel PxH. For example, the unit pixel Px (1, 3) and the unit pixel Px (3, 1) described with reference to FIG. 9 is the non-edge pixel PxH.

As illustrated in FIGS. 8 and 9, in the present embodiment, the unit pixel Px corresponding to the four non-boundary pixels PvH is the non-edge pixel PxH. In addition, the unit pixel Px corresponding to the four desired pixels Pv having the boundary pixel PvK may be the edge pixel PxK.

The gradation converting unit 515 converts (decreases gradation) the image signal VLA into the image signal VLa having lower gradation than the image signal VLA and converts the image signal VLB into the image signal VLb having lower gradation than the image signal VLB. Specifically, the gradation converting unit 515 generates the image signal VLa which designates a gradation level Lv3 (one example of third gradation level) of Q bits (Q is a natural number satisfying 1≤Q<P) based on the image signal VLA which designates the gradation level Lv1 of P bits (3 bits in this embodiment). The gradation level Lv3 is determined based on the gradation level Lv1 and is the gradation level having lower gradation than the gradation level Lv1. For example, the gradation level representing gradation closest to the gradation level Lv1 among the gradation levels of Q bits may be determined as the gradation level Lv3.

In the same manner, the gradation converting unit 515 generates the image signal VLb which designates a gradation level Lv4 (one example of fourth gradation level) of Q bits based on the image signal VLB which designates the gradation level Lv2 of P bits. The gradation level Lv4 is determined based on the gradation level Lv2 and is the gradation level having lower gradation than the gradation level Lv2. For example, the gradation level representing gradation closest to the gradation level Lv2 among the gradation levels of Q bits may be determined as the gradation level Lv4.

In the present embodiment, as an example, the gradation level Lv3 and the gradation level Lv4 are the gradation levels of 2 bits (case where Q=2). Furthermore, the number of the bits (number instead of Q) is an example and a predetermined natural number satisfying 1≤Q<P may be used.

In addition, hereinafter, the gradation level obtained by decreasing gradation of the designation gradation level LvS1 to Q bits is referred to as "designation gradation level LvS3" (one example of "third designation gradation level") and the gradation level obtained by decreasing gradation of the designation gradation level LvS2 to Q bits is referred to as "designation gradation level LvS4" (one example of "fourth designation gradation level").

In the present embodiment, the gradation level of Q bits (2 bits) includes four types of the gradation levels of "0", "2", "4", and "6". In addition, in the present embodiment, the gradation converting unit 515 converts the gradation levels of "0" and "1" into the gradation level of "0" of Q bits (2 bits), converts the gradation levels of "2" and "3" of P bits into the gradation level of "2" of Q bits, converts the gradation levels of "4" and "5" of P bits into the gradation level of "4" of Q bits, and converts the gradation levels of "6" and "7" of P bits into the gradation level of "6" of Q bits among the gradation levels of P bits (3 bits).

In the present embodiment, the gradation level of P bits (3 bits) can be expressed by the 2α (eight) subfield periods sf. In addition, the gradation level of Q bits (3 bits) can be expressed by the α (four) subfield periods sf.

The storage unit 517 stores the lookup table LT1 storing first designation information IF1 and the lookup table LT2 storing second designation information IF2. Hereinafter, the lookup table LT1 and the lookup table LT2 may be appellatively referred to as "lookup table LT". In addition, the first designation information IF1 and the second designation information IF2 may be appellatively referred to as "designation information IF".

FIG. 10 is a diagram for explaining the first designation information IF1. When causing the unit pixel Px to display the gradation level of Q bits for the α subfield periods sf, the first designation information IF1 is information designating the on-state or the off-state of the unit pixel Px for each of the α subfield periods sf. The first designation information IF1 according to the present embodiment is aggregation of the gradation levels of Q bits and subfield codes (SF codes) Cds of 2 to the power of Q associated one-to-one with the gradation levels of Q bits. The SF code Cds is information indicating a disposition pattern of the subfield periods sf for which the unit pixel Px is designated to be in the on-state among the α subfield periods sf.

As described above, in the present embodiment, it is assumed that α is "4" and Q is "2". That is, the first designation information IF1 according to the present embodiment includes four types of the gradation levels and the four SF codes Cds associated one-to-one with the four types of the gradation levels. As illustrated in FIG. 10, the SF code Cds[k] (k is a natural number satisfying 0≤k≤3) includes α designation values cj (in FIG. 10, j is a natural number satisfying 1≤j≤α). The designation value cj is a value designating the on-state or the off-state of the unit pixel Px for the j-th subfield period sf among the α (four) subfield periods sf.

FIG. 11 is a diagram for explaining the second designation information IF2. When causing the unit pixel Px to display the gradation level of P bits for the 2α subfield periods sf, the second designation information IF2 is information designating the on-state or the off-state of the unit pixel Px for each of the 2α subfield periods sf. The second designation information IF2 according to the present embodiment is aggregation of the gradation levels of P bits and SF codes Cdl of 2 to the power of P associated one-to-one with the gradation levels of P bits. The SF code Cdl is information indicating a disposition pattern of the subfield periods sf for which the unit pixel Px is designated to be in the on-state among the 2α subfield periods sf.

In the present embodiment, it is assumed that a is "4" and Q is "3". In addition, as described above, in the present embodiment, the gradation level of P bits (3 bits) includes eight types of the gradation levels of "0" to "7". That is, the second designation information IF2 according to the present embodiment includes the eight types of the gradation levels and the eight SF codes Cdl associated one-to-one with the eight types of the gradation levels. As illustrated in FIG. 11, the SF code Cdl[g] (g is a natural number satisfying 0≤g≤7) includes 2α designation values cj (in FIG. 11, j is a natural number satisfying 1≤j≤2α). The designation value cj is a value designating the on-state or the off-state of the unit pixel Px for the j-th subfield period sf among the 2α (eight) subfield periods sf.

Hereinafter, the SF code Cds and the SF code Cdl may be appellatively referred to as "SF code Cd".

The designation signal generating unit 516 generates the designation signal D based on the image signals VCL, VLA, and VLa, or VLb and the designation information IF stored in the lookup table LT. Hereinafter, the image signal (that is, signal used for generating designation signal D) input to the designation signal generating unit 516 may be appellatively referred to as "image signal VLin".

Specifically, in a case of causing the unit pixel Px to display the gradation level of Q bits (2 bits), the designation signal generating unit 516 generates the designation signal D designating the on-state or the off-state of the unit pixel Px for each of the α (four) subfield periods sf based on the SF code Cds corresponding to the gradation level to be displayed with reference to the lookup table LT1. In addition, in a case of causing the unit pixel Px to display the gradation level of P bits (3 bits), the designation signal generating unit 516 generates the designation signal D designating the on-state or the off-state of the unit pixel Px for each of the 2α (eight) subfield periods sf based on the SF code Cdl corresponding to the gradation level to be displayed with reference to the lookup table LT2.

Here, a process of the designation signal generating unit 516 in a case of causing the unit pixel Px to display, for example, the gradation level of "4" for the unit period U will be described. The designation signal generating unit 516 obtains the SF code Cds[2] corresponding to the gradation level of "4" from the lookup table LT1 illustrated in FIG. 10. The SF code Cds[2] includes the designation values c1 and c4 designating the off-state of the unit pixel Px for the first and fourth subfield periods sf and the designation values c2 and c3 designating the on-state of the unit pixel Px for the second and third subfield periods sf, among the four subfield periods sf. The designation signal generating unit 516 generates the designation signal D which causes the unit pixel Px to display the minimum gradation level for the first and fourth subfield periods sf and causes the unit pixel Px to display the maximum gradation level for the second and third subfield periods sf based on the SF code Cds[2].

Figure 12:
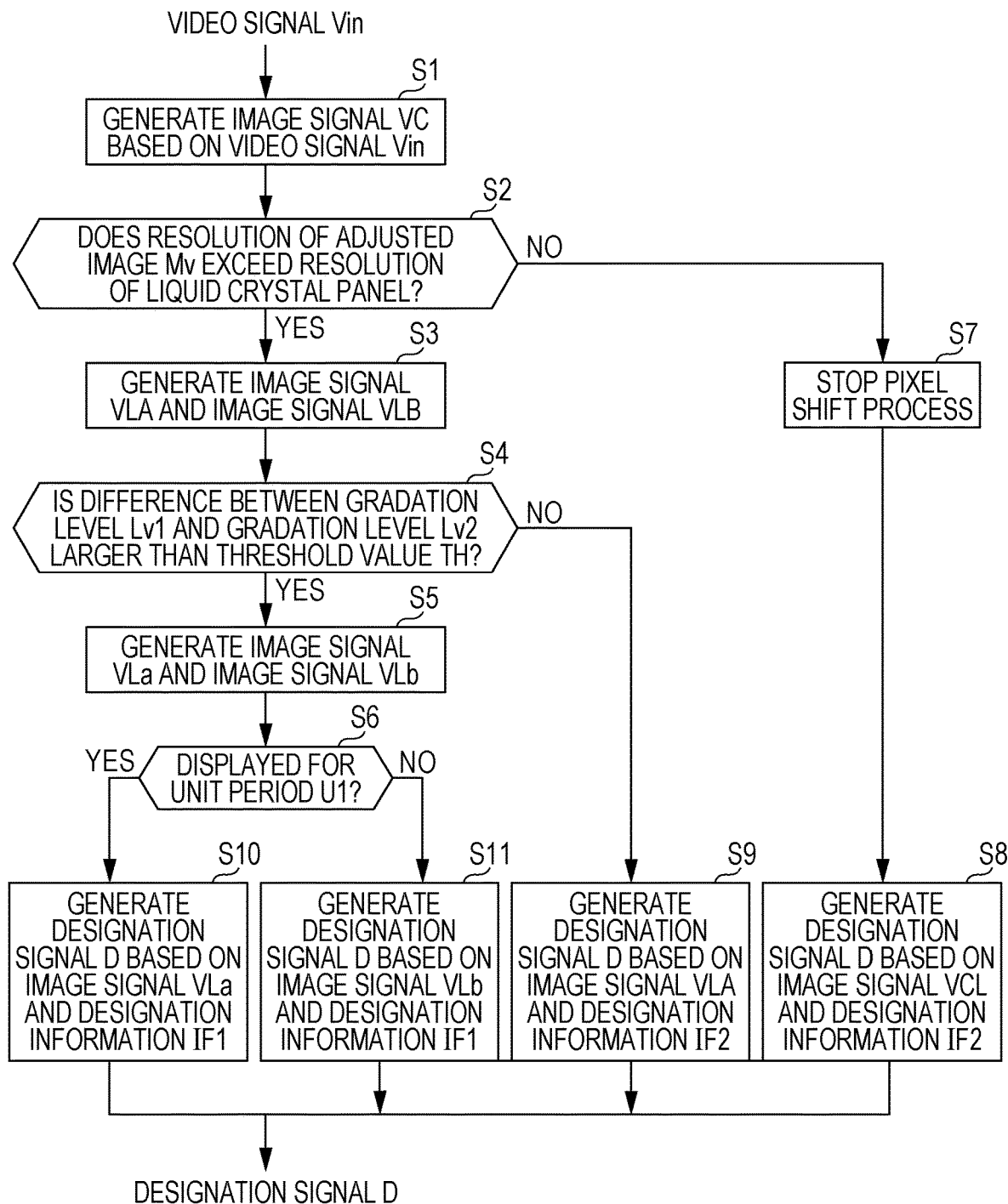
FIG. 12 is a flowchart for explaining a process of generating a designation signal.

Next, a flow of a process in the image processing unit 11 will be described with reference to FIG. 12.

The image quality adjusting unit 511 generates the image signal VC representing the adjusted image Mv based on the input video signal Vin (S1). The resolution determining unit 512 determines whether or not the resolution of the adjusted image Mv exceeds the resolution of the liquid crystal panel 10 (S2). In a case where the resolution of the adjusted image Mv is equal to or less than the resolution of the liquid crystal panel 10 (NO in S2), the pixel shift process is not needed. For this reason, in the case where the resolution of the adjusted image Mv is equal to or less than the resolution of the liquid crystal panel 10, the resolution determining unit 512 supplies the control signal CLU, which designates that the optical path shift element 100 is not driven, to the optical path shift element driving unit 14 to stop driving of the optical path shift element 100 (S7). The designation signal generating unit 516 generates the designation signal D based on the image signal VCL and the second designation information IF2 stored in the lookup table LT2 (S8). The designation signal D in this case is a signal which causes the unit pixel Px to display the gradation level Lvin of P bits designated by the image signal VCL for the frame period F.

In a case where the resolution of the adjusted image Mv exceeds the resolution of the liquid crystal panel 10 (YES in S2), the resolution converting unit 513 generates the image signal VLA and the image signal VLB based on the image signal VCH (S3). The determining unit 514 determines whether or not a difference between the gradation level Lv1 designated by the image signal VLA and the gradation level Lv2 designated by the image signal VLB is larger than the threshold value TH (S4). In a case where the difference between the gradation level Lv1 and the gradation level Lv2 is equal to or less than the threshold value TH (that is, the unit pixel Px corresponding to the image signal VLA and the image signal VLB is the non-edge pixel PxH) (NO in S4), the designation signal generating unit 516 generates the designation signal D based on the image signal VLA and the second designation information IF2 stored in the lookup table LT2 (S9). The designation signal D in this case is a signal which causes the unit pixel Px to display the gradation level Lv1 of P bits designated by the image signal VLA for the frame period F.

In the present embodiment, as an example in step S9, the designation signal generating unit 516 generates the designation signal D based on the image signal VLA and the second designation information IF2 stored in the lookup table LT2. Furthermore, the designation signal generating unit 516 may generate the designation signal D based on the image signal VLB instead of the image signal VLA. That is, in step S9, the designation signal generating unit 516 may generate the designation signal D based on the image signal VLB and the second designation information IF2 stored in the lookup table LT2.

In a case where the difference between the gradation level Lv1 and the gradation level Lv2 is larger than the threshold value TH in step S4 (that is, the unit pixel Px corresponding to the image signal VLA and the image signal VLB is the edge pixel PxK) (YES in S4), the gradation converting unit 515 generates the image signal VLa based on the image signal VLA and generates the image signal VLb based on the image signal VLB (S5). The designation signal generating unit 516 determines whether or not the designation signal D to be generated is a signal supplied to the liquid crystal panel 10 for the unit period U1 based on the control signal CLT (S6).

In a case where a determination result is positive in step S6 (that is, the designation signal D to be generated corresponds to the unit period U1) (YES in S6), the designation signal generating unit 516 generates the designation signal D based on the image signal VLa and the first designation information IF1 stored in the lookup table LT1 (S10). The designation signal D in this case is a signal which causes the unit pixel Px to display the gradation level Lv3 of Q bits designated by the image signal VLa for the unit period U1.

In a case where a determination result is negative in step S6 (case where the designation signal D to be generated does not correspond to the unit period U1, that is, the designation signal D to be generated corresponds to the unit period U2) (NO in S6), the designation signal generating unit 516 generates the designation signal D based on the image signal VLb and the first designation information IF1 stored in the lookup table LT1 (S11). The designation signal D in this case is a signal which causes the unit pixel Px to display the gradation level Lv4 of Q bits designated by the image signal VLb for the unit period U2.

When the designation signal D generated as described above for each of the plurality of the unit pixels Px is supplied to the data line driving circuit 24, the data line driving circuit 24 generates the data signals VD[1] to VD[N] for each of the subfield periods sf based on the supplied designation signal D and supplies the data signals VD[1] to VD[N] to the unit pixel Px. In this way, the on-state or the off-state of each of the unit pixels Px for each of the subfield periods sf is controlled, and each of the unit pixels Px displays the gradation level according to the designation signal D as a result.

As described above, in the projector 1 according to the present embodiment, in the case where the resolution of the adjusted image My exceeds the resolution of the liquid crystal panel 10, the designation signal D causing the edge pixel PxK (determination result is positive in step S4) to display the gradation level of Q bits for the α subfield periods sf is generated. On the other hand, the designation signal D causing the non-edge pixel PxH (determination result is negative in step S4) to display the gradation level of P bits for the 2α subfield periods sf is generated.

Figure 13:
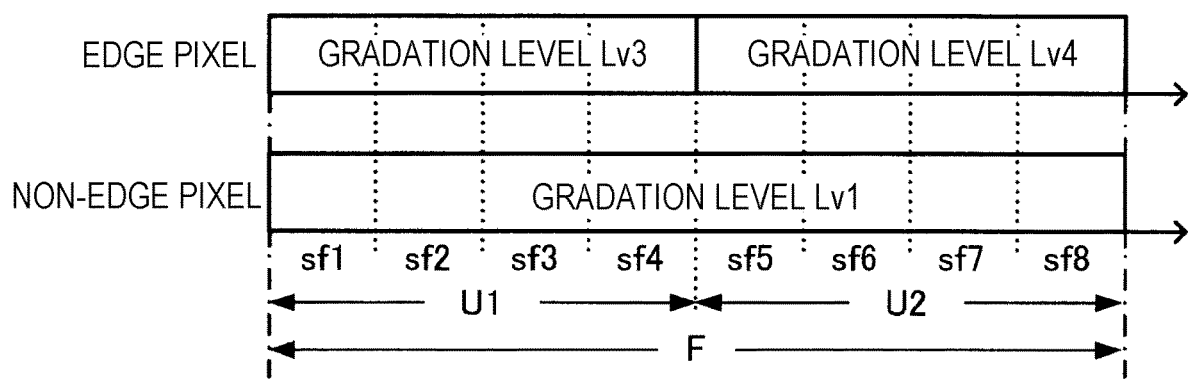
FIG. 13 is a diagram for explaining a gradation level displayed by an edge pixel and a non-edge pixel.

FIG. 13 is a diagram for explaining the gradation level displayed by the edge pixel PxK and the non-edge pixel PxH. As illustrated in FIG. 13, the edge pixel PxK displays the gradation level Lv3 according to the designation signal D generated in step S10 in FIG. 12 for the unit period U1 and displays the gradation level Lv4 according to the designation signal D generated in step S11 in FIG. 12 for the unit period U2. In addition, as illustrated in FIG. 13, the non-edge pixel PxH displays the gradation level Lv1 according to the designation signal D generated in step S9 in FIG. 12 for the frame period F (that is, all of the unit period U1 and the unit period U2). In a case where the designation signal D is generated based on the image signal VLB in step S9, the non-edge pixel PxH displays the gradation level Lv2 according to the image signal VLB for the frame period F.

Next, with reference to FIG. 14, the image signal VLout and the image signal VLin corresponding to the edge pixel PxK and the non-edge pixel PxH will be described.

Figure 14:
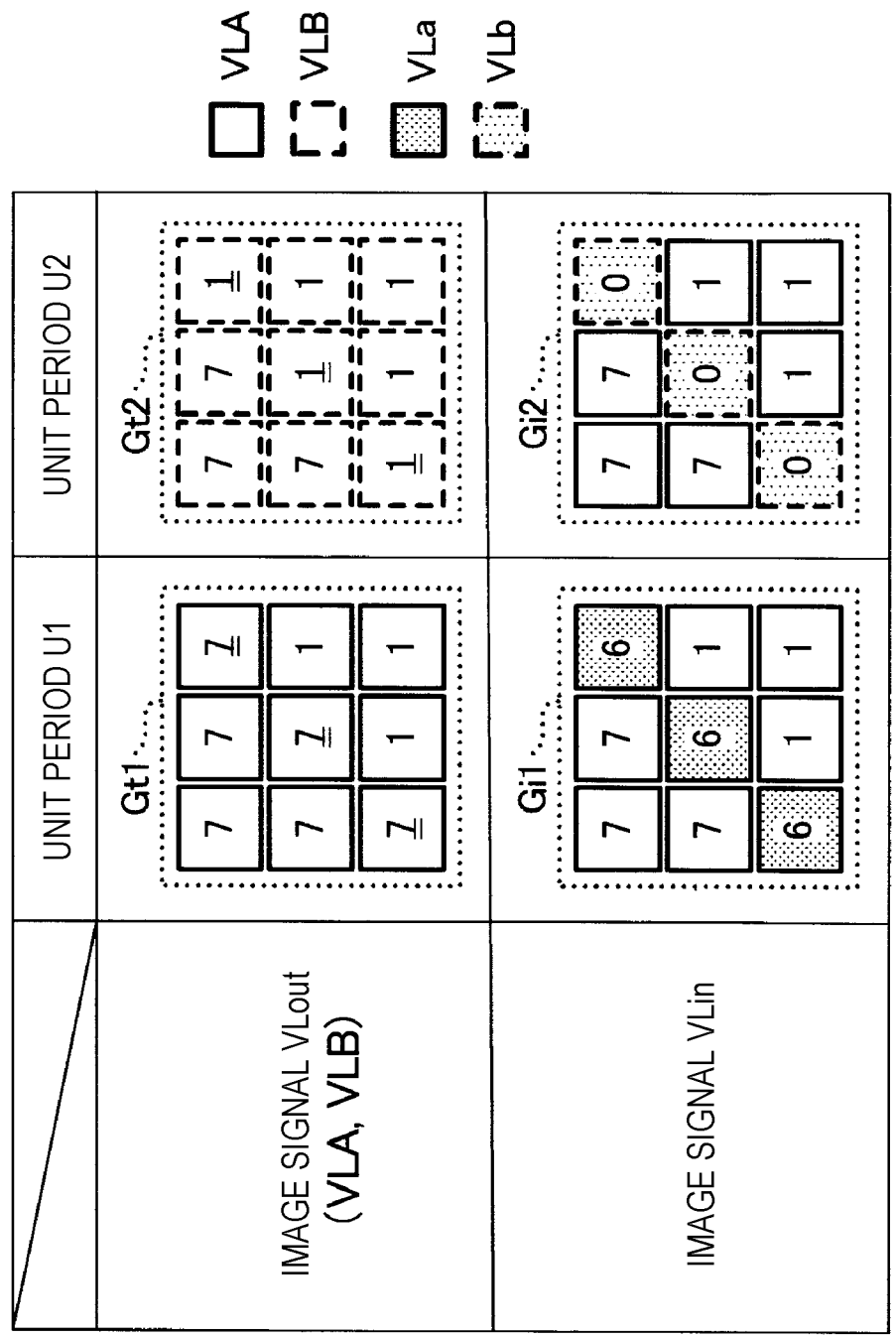
FIG. 14 is a diagram for explaining an image signal VLout and an image signal VLin.

FIG. 14 is a diagram illustrating a relationship between the nine image signals VLA (hereinafter, referred to as "signal group Gt1") corresponding to the nine unit pixels Px generated based on the gradation level displayed by the 36 desired pixels Pv included in the region AA illustrated in FIG. 7, the nine image signals VLin (hereinafter, referred to as "signal group Gi1") input to the designation signal generating unit 516 corresponding to the nine image signals VLA, the nine image signals VLB (hereinafter, referred to as "signal group Gt2") corresponding to the nine unit pixels Px generated based on the gradation level displayed by the 36 desired pixels Pv included in the region BB illustrated in FIG. 7, and the nine image signals VLin (hereinafter, referred to as "signal group Gi2") input to the designation signal generating unit 516 corresponding to the nine image signals VLB in a case where the image signal VC is the image signal VCH.

In the same manner as FIGS. 7 to 9, also in FIG. 14, it is assumed that the gradation level Lvin displayed by the video signal Vin and the image signal VC is the designation gradation level LvS1 (for example, "7") or the designation gradation level LvS2 (for example, "1") and the gradation level displayed by the image signal VLA and the image signal VLB is also the designation gradation level LvS1 or the designation gradation level LvS2.

As described above, in the present embodiment, the predetermined threshold value TH is set to "0". For this reason, the unit pixel Px, in a case where the gradation level Lv1 designated by the image signal VLA is the designation gradation level LvS1 and the gradation level Lv2 designated by the image signal VLB is the designation gradation level LvS1, is the non-edge pixel PxH. Regarding the non-edge pixel PxH, the image signal VLin input to the designation signal generating unit 516 corresponding to the image signal VLA becomes the image signal VLA indicating the designation gradation level LvS1 and the image signal VLin input to the designation signal generating unit 516 corresponding to the image signal VLB becomes the image signal VLB indicating the designation gradation level LvS1. That is, the non-edge pixel PxH displays the designation gradation level LvS1 for the frame period F. Hereinafter, such the non-edge pixel PxH is referred to as "unit pixel PxA" (one example of "first pixel").

In addition, the unit pixel Px, in a case where the gradation level Lv1 designated by the image signal VLA is the designation gradation level LvS2 and the gradation level Lv2 designated by the image signal VLB is the designation gradation level LvS2, is the non-edge pixel PxH. Regarding the non-edge pixel PxH, the image signal VLin input to the designation signal generating unit 516 corresponding to the image signal VLA becomes the image signal VLA indicating the designation gradation level LvS2 and the image signal VLin input to the designation signal generating unit 516 corresponding to the image signal VLB becomes the image signal VLB indicating the designation gradation level LvS2. That is, the non-edge pixel PxH displays the designation gradation level LvS2 for the frame period F. Hereinafter, such the non-edge pixel PxH is referred to as "unit pixel PxB" (one example of "second pixel").

In addition, the unit pixel Px, in a case where the gradation level Lv1 designated by the image signal VLA is the designation gradation level LvS1 and the gradation level Lv2 designated by the image signal VLB is the designation gradation level LvS2, is the edge pixel PxK. Regarding the edge pixel PxK, the image signal VLin input to the designation signal generating unit 516 corresponding to the image signal VLA becomes the image signal VLa indicating the designation gradation level LvS3 (for example, "6") and the image signal VLin input to the designation signal generating unit 516 corresponding to the image signal VLB becomes the image signal VLb indicating the designation gradation level LvS4 (for example, "0"). That is, the edge pixel PxK displays the designation gradation level LvS3 for the unit period U1 and displays the designation gradation level LvS4 for the unit period U2. Hereinafter, such the edge pixel PxK is referred to as "unit pixel PxC" (one example of "third pixel").

The unit pixel Px, in a case where the gradation level Lv1 designated by the image signal VLA is the designation gradation level LvS2 and the gradation level Lv2 designated by the image signal VLB is the designation gradation level LvS1, is the edge pixel PxK (not illustrated in FIG. 14). Regarding the edge pixel PxK, the image signal VLin input to the designation signal generating unit 516 corresponding to the image signal VLA becomes the image signal VLa indicating the designation gradation level LvS4 and the image signal VLin input to the designation signal generating unit 516 corresponding to the image signal VLB becomes the image signal VLb indicating the designation gradation level LvS3. That is, the edge pixel PxK is the unit pixel Px which displays the designation gradation level LvS4 for the unit period U1 and displays the designation gradation level LvS3 for the unit period U2. Hereinafter, such the edge pixel PxK is also referred to as "unit pixel PxC".

In the present embodiment, the gradation level seen by a user of the projector 1 is the gradation level displayed by the unit pixel Px within the frame period F. In addition, in the present embodiment, in a case where, during the frame period F, the gradation level Lv3 is displayed for the unit period U1 and the gradation level Lv4 is displayed for the unit period U2, it is assumed that the gradation level seen by the user for the frame period F is, for example, an average gradation level of the gradation level Lv3 and the gradation level Lv4.

For example, in a case where the unit pixel Px displays the gradation level of "6" for the unit period U1 and displays the gradation level of "0" for the unit period U2, the user sees the gradation level of "3" for the frame period F including the unit period U (the unit period U1 and the unit period U2).

Here, the image displayed by the projector 1 according to the present embodiment will be described in detail with reference to FIGS. 15 and 16.

Figure 15:
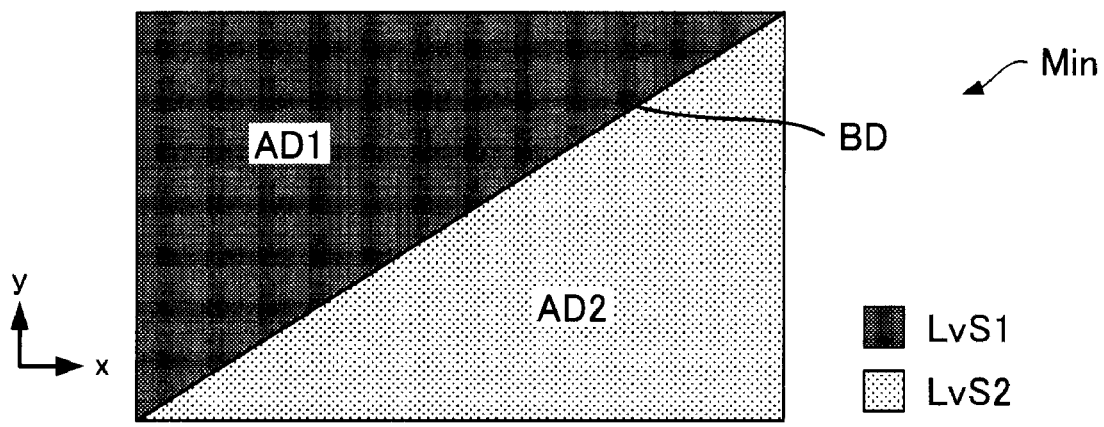
FIG. 15 is a diagram illustrating an example of a desired image.

FIG. 15 illustrates a case where the desired image Min displayed by the video signal Vin includes an area AD1 (one example of "first area") and an area AD2 (one example of "second area"). The area AD1 is an area in which the desired pixel Pv represents the designation gradation level LvS1 (gradation level of "7") and the area AD2 is an area in which the desired pixel Pv represents the designation gradation level LvS2 (gradation level of "1"). That is, the video signal Vin representing the desired image Min illustrated in FIG. 15 is a signal which displays the designation gradation level LvS1 of P bits in the area AD1 and displays the designation gradation level LvS2 of P bits in the area AD2.

FIG. 7 illustrates a part of the adjusted image Mv. FIG. 15 illustrates all of the desired image Min. As described above, in the same manner as the video signal Vin, the image signal VC represents the gradation level of P bits. For this reason, the image signal VCH generated based on the video signal Vin according to the present example represents the adjusted image Mv in the same manner as the desired image Min illustrated in FIG. 15. The boundary pixels PvK are disposed on both sides of a boundary BD between the area AD1 and the area AD2 in the desired image Min illustrated in FIG. 15. In addition, in the desired image Min, the non-boundary pixels PvH are disposed at a portion in which the boundary pixels PvK are not disposed.

Figure 16:
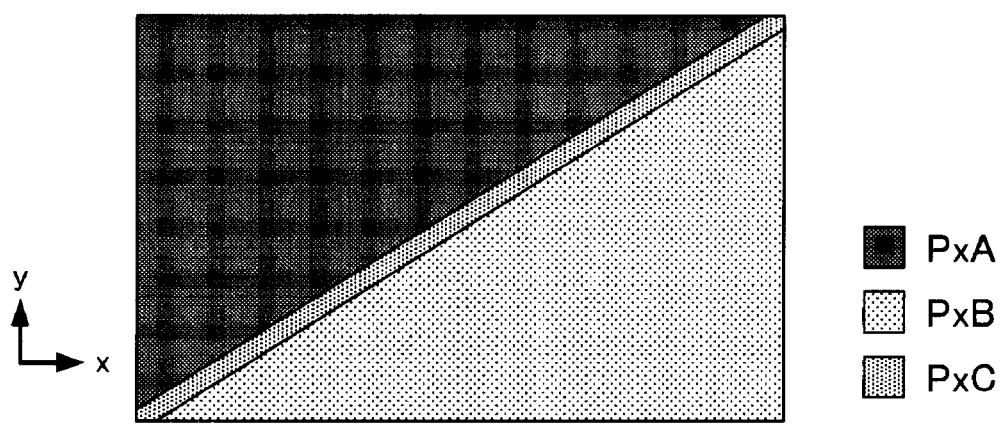
FIG. 16 is a diagram illustrating an example of aggregation of unit pixels included in the projector.

FIG. 16 illustrates the gradation level displayed by the unit pixels Px provided on the liquid crystal panel 10 of the projector 1 in M rows by N columns in a case where the video signal Vin representing the desired image Min illustrated in FIG. 15 is input to the projector 1.

The area AD1 of the desired image Min illustrated in FIG. 15 includes a first region having the plurality of the desired pixels Pv. Regarding the plurality of the desired pixels Pv, all of the four desired pixel Pv corresponding to the unit region URA display the designation gradation level LvS1 and all of the four desired pixel Pv corresponding to the unit region URB display the designation gradation level LvS1. In addition, the area AD2 of the desired image Min illustrated in FIG. 15 includes a second region having the plurality of the desired pixels Pv. All of the four desired pixel Pv corresponding to the unit region URA display the designation gradation level LvS2 and all of the four desired pixel Pv corresponding to the unit region URB display the designation gradation level LvS2. In addition, a region including the boundary BD of the desired image Min illustrated in FIG. 15 includes a third region having the plurality of the desired pixels Pv. Regarding the plurality of the desired pixels Pv, the four desired pixels Pv corresponding to the unit region URA include the desired pixel Pv displaying the designation gradation level LvS1 and the desired pixel Pv displaying the designation gradation level LvS2 and the four desired pixels Pv corresponding to the unit region URB include the desired pixel Pv displaying the designation gradation level LvS1 and the desired pixel Pv displaying the designation gradation level LvS2.

In a case where the video signal Vin representing the desired image Min illustrated in FIG. 15 is input to the projector 1, the plurality of the unit pixels Px included in the projector 1 at least includes the unit pixel PxA representing the designation gradation level LvS1 of P bits corresponding to the first region, the unit pixel PxB representing the designation gradation level LvS2 of P bits corresponding to the second region, and the unit pixel PxC representing the designation gradation level LvS3 and the designation gradation level LvS4 of Q bits corresponding to the third region.

Next, an output in the case where the video signal Vin representing the desired image Min illustrated in FIG. 15 is input to the projector 1 will be described in view of a change in the relative transmittance of the liquid crystal element CL included in the unit pixel Px of the projector 1. FIGS. 17 to 20 illustrate examples of changes (hereinafter, referred to as "transmittance change") in the relative transmittance of the liquid crystal element CL of the unit pixel Px together with the SF code Cd corresponding to the gradation level when the unit pixel Px displays the gradation level.

Hereinafter, for convenience, the liquid crystal elements CL included in the unit pixel PxA, the unit pixel PxB, and the unit pixel PxC are respectively referred to as "liquid crystal element CLA", "liquid crystal element CLB", and "liquid crystal element CLC".

Figure 17:
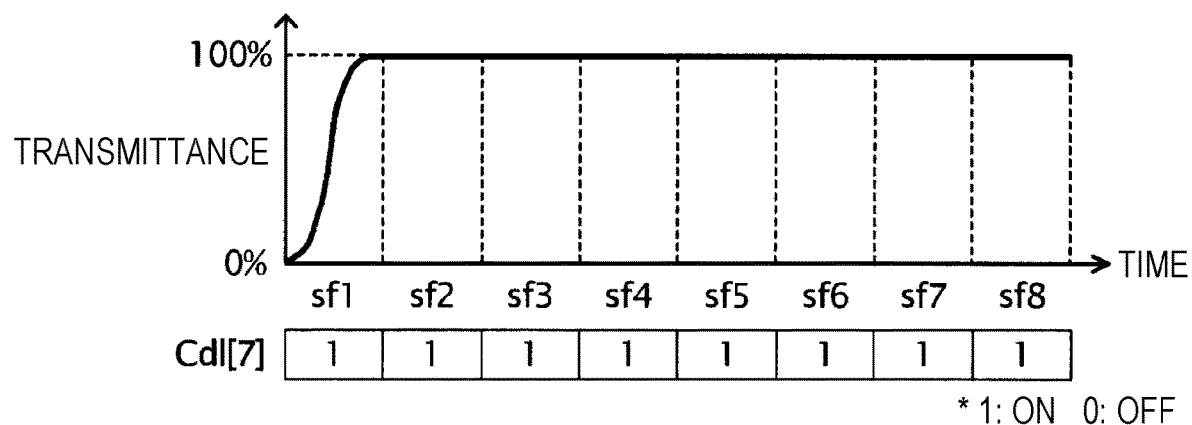
FIG. 17 is a diagram illustrating an example of a transmittance change of a liquid crystal element in a case where a gradation level expressible by $2\alpha$ subfields is displayed.
Figure 18:
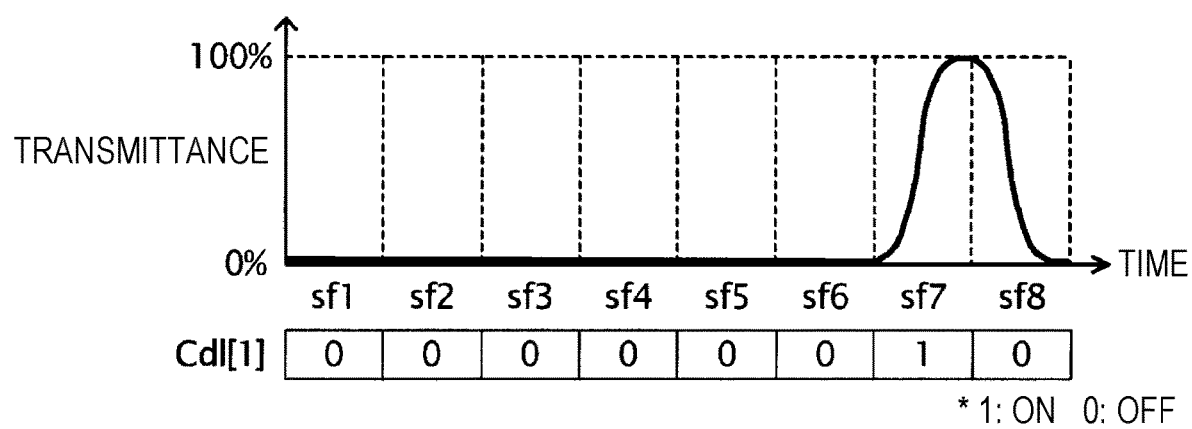
FIG. 18 is a diagram illustrating another example of a transmittance change of the liquid crystal element in the case where the gradation level expressible by the $2\alpha$ subfields is displayed.

The change in transmittance of the liquid crystal element CLA from the unit period U1 to the unit period U2 (that is, for frame period F) indicates a transmittance change when the unit pixel Px displays the designation gradation level LvS1. FIG. 17 illustrates the example of the transmittance change of the liquid crystal element CLA for the frame period F when the unit pixel PxA displays the designation gradation level LvS1 (gradation level of "7") for the frame period F. In addition, a change in transmittance of the liquid crystal element CLB for frame period F indicates a transmittance change when the unit pixel Px displays the designation gradation level LvS2. FIG. 18 illustrates the example of the transmittance change of the liquid crystal element CLB for the frame period F when the unit pixel PxB displays the designation gradation level LvS2 (gradation level of "1") for the frame period F. As illustrated in FIGS. 17 and 18, the designation gradation level LvS1 of P bits (gradation level of "7") and the designation gradation level LvS2 of P bits (gradation level of "1") are the gradation levels expressible by the 2α (eight) subfield periods sf. In other words, the designation gradation level LvS1 and the designation gradation level LvS2 are not the gradation levels expressible by the α (four) subfield periods sf.

Figure 19:
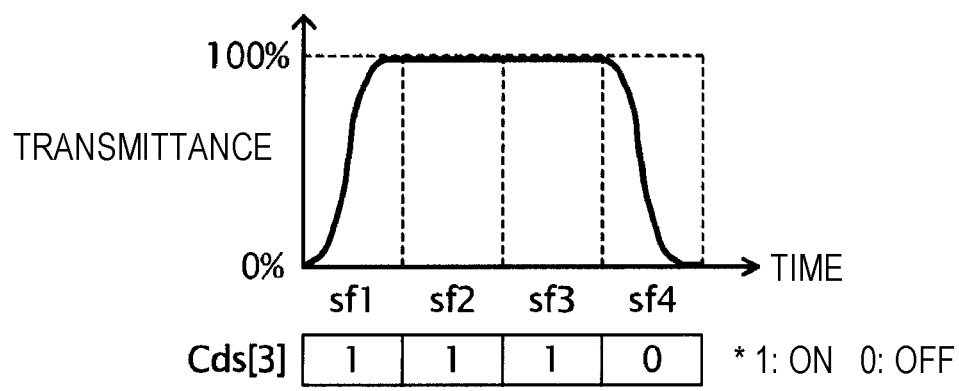
FIG. 19 is a diagram illustrating an example of a transmittance change of the liquid crystal element in a case where a gradation level expressible by $\alpha$ subfields is displayed.
Figure 20:
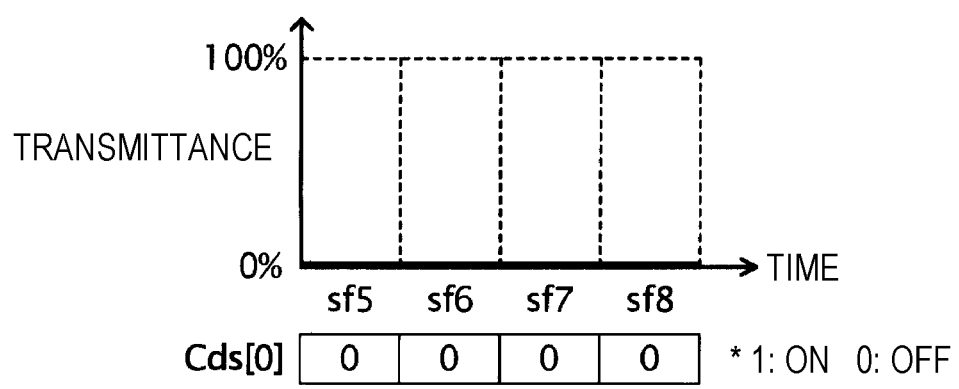
FIG. 20 is a diagram illustrating another example of a transmittance change of the liquid crystal element in the case where the gradation level expressible by the $\alpha$ subfields is displayed.

On the other hands, a change in transmittance of the liquid crystal element CLC for the unit period U1 indicates a transmittance change when the unit pixel PxC displays the designation gradation level LvS3 and the change in the transmittance of the liquid crystal element CLC for the unit period U2 indicates a transmittance change when the unit pixel PxC displays the designation gradation level LvS4. FIG. 19 illustrates the example of the transmittance change of the liquid crystal element CLC for the unit period U1 when the unit pixel PxC displays the designation gradation level LvS3 (gradation level of "6") for the unit period U1. FIG. 20 illustrates the example of the transmittance change of the liquid crystal element CLC for the unit period U2 when the unit pixel PxC displays the designation gradation level LvS4 (gradation level of "0") for the unit period U2. As illustrated in FIGS. 19 and 20, the designation gradation level LvS3 of Q bits (gradation level of "6") and the designation gradation level LvS4 of Q bits (gradation level of "0") are the gradation levels expressible by the α (four) subfield periods sf.

As described above, in the present embodiment, the unit pixel PxA and the unit pixel PxB which are the non-edge pixels PxH display the designation gradation level LvS1 of P bits and the designation gradation level LvS2 of P bits for the frame period F and the unit pixel PxC which is the edge pixel PxK displays the designation gradation level LvS3 of Q bits and the designation gradation level LvS4 of Q bits for the unit period U. The gradation level of P bits is the gradation level expressible by the 2α subfield periods sf and the gradation level of Q bits is the gradation level expressible by the α subfield periods sf. For this reason, in a case where the video signal Vin representing the desired image Min illustrated in FIG. 15 is input to the projector 1 according to the present embodiment, both of the transmittance change (illustrated in FIGS. 17 and 18) of the liquid crystal element CL for the 2α subfield periods sf and the transmittance change (illustrated in FIGS. 19 and 20) of the liquid crystal element CL for the α subfield periods sf are illustrated.

Hereinafter, a reason that the edge pixel PxK is caused to display the gradation level expressible by the α subfield periods sf and the non-edge pixel PxH is caused to display the gradation level expressible by the 2α subfield periods sf larger than the edge pixel PxK will be described with reference to a comparative example of causing the unit pixel Px to display only the gradation level expressible by the α subfield periods sf regardless whether or not the unit pixel Px is the edge pixel PxK.

Figure 21:
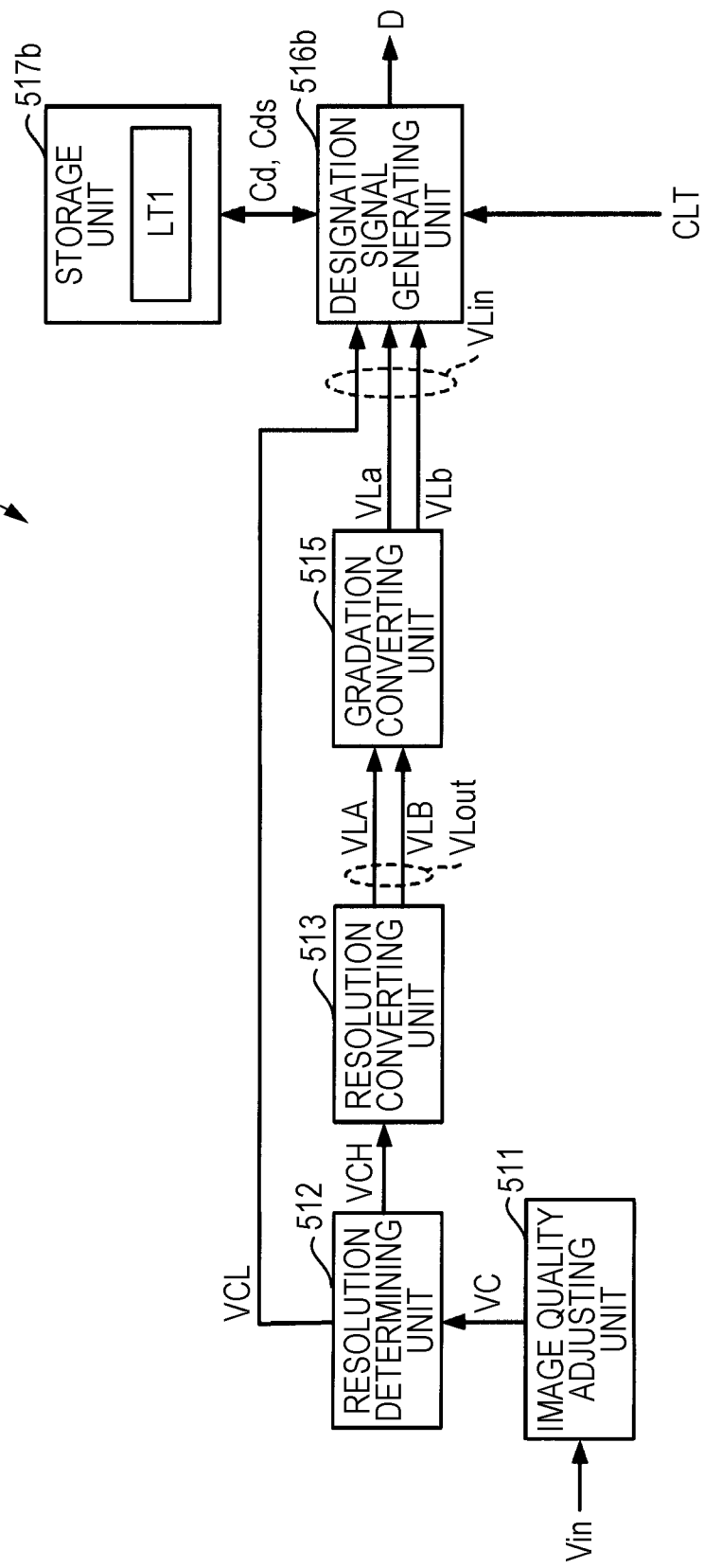
FIG. 21 is a block diagram illustrating a configuration of an image processing unit according to a comparative example.

FIG. 21 is a block diagram illustrating a configuration of the image processing unit (referred to as "image processing unit 11b") included in the projector (referred to as "projector 1b") according to the comparative example. Hereinafter, the same reference numerals as in the present embodiment are used for the same configuration elements as those according to the present embodiment among the configuration elements include in the image processing unit 11b and a description thereof will be appropriately omitted. In the present embodiment, it is assumed that the projector 1b executes the pixel shift process (a signal input to the resolution converting unit 513 is the image signal VCH).

In the same manner as the present embodiment, the image processing unit 11b includes the image quality adjusting unit 511, the resolution determining unit 512, and the resolution converting unit 513. On the other hand, as illustrated in FIG. 21, the image processing unit 11b according to the comparative example does not include the determining unit 514. That is, the projector 1b according to the comparative example does not execute determination in step S4 in FIG. 12 (whether or not the unit pixel Px is the edge pixel PxK).

As described above, it is not determined whether or not the unit pixel Px is the edge pixel PxK in the present comparative example, but for explaining a difference between the present embodiment and the comparative example, the edge pixel PxK and the non-edge pixel PxH will be divisively described also in the present comparative example.

As illustrated in FIG. 21, the image signal VLout is input from the resolution converting unit 513 to the gradation converting unit 515 instead of the determining unit 514. A designation signal generating unit 516b generates the designation signal D for each of the unit pixels Px based on the image signal VLa or the image signal VLb regardless whether the unit pixel Px is the edge pixel PxK or the non-edge pixel PxH. That is, the unit pixel Px according to the comparative example displays only the gradation level expressible by the α (four) subfield periods sf.

Figure 22:
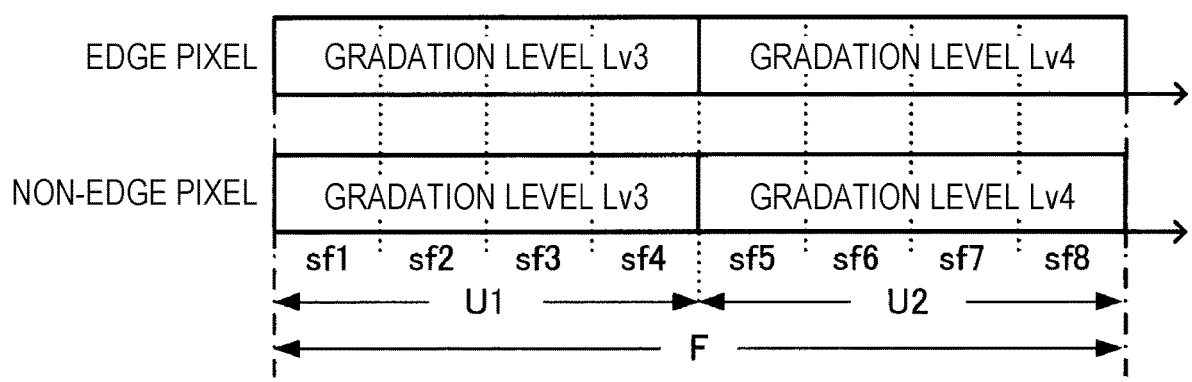
FIG. 22 is a diagram for explaining a gradation level displayed by an edge pixel and a non-edge pixel according to the comparative example.

FIG. 22 is a diagram for explaining the gradation level displayed by the edge pixel and the non-edge pixel according to the comparative example. As illustrated in FIG. 22, the edge pixel PxK displays the gradation level Lv3 designated by the image signal VLa for the unit period U1 and displays the gradation level Lv4 designated by the image signal VLb for the unit period U2, in the same manner as the present embodiment illustrated in FIG. 13. On the other hand, the example illustrated in FIG. 22 is different from the example illustrated in FIG. 13 in that the non-edge pixel PxH displays the gradation level Lv3 for the unit period U1 and displays the gradation level Lv4 for the unit period U2 in the same manner as the edge pixel PxK.

Next, with reference to FIG. 23, the image signal VLout and the image signal VLin corresponding to the edge pixel PxK and the non-edge pixel PxH will be described.

Figure 23:
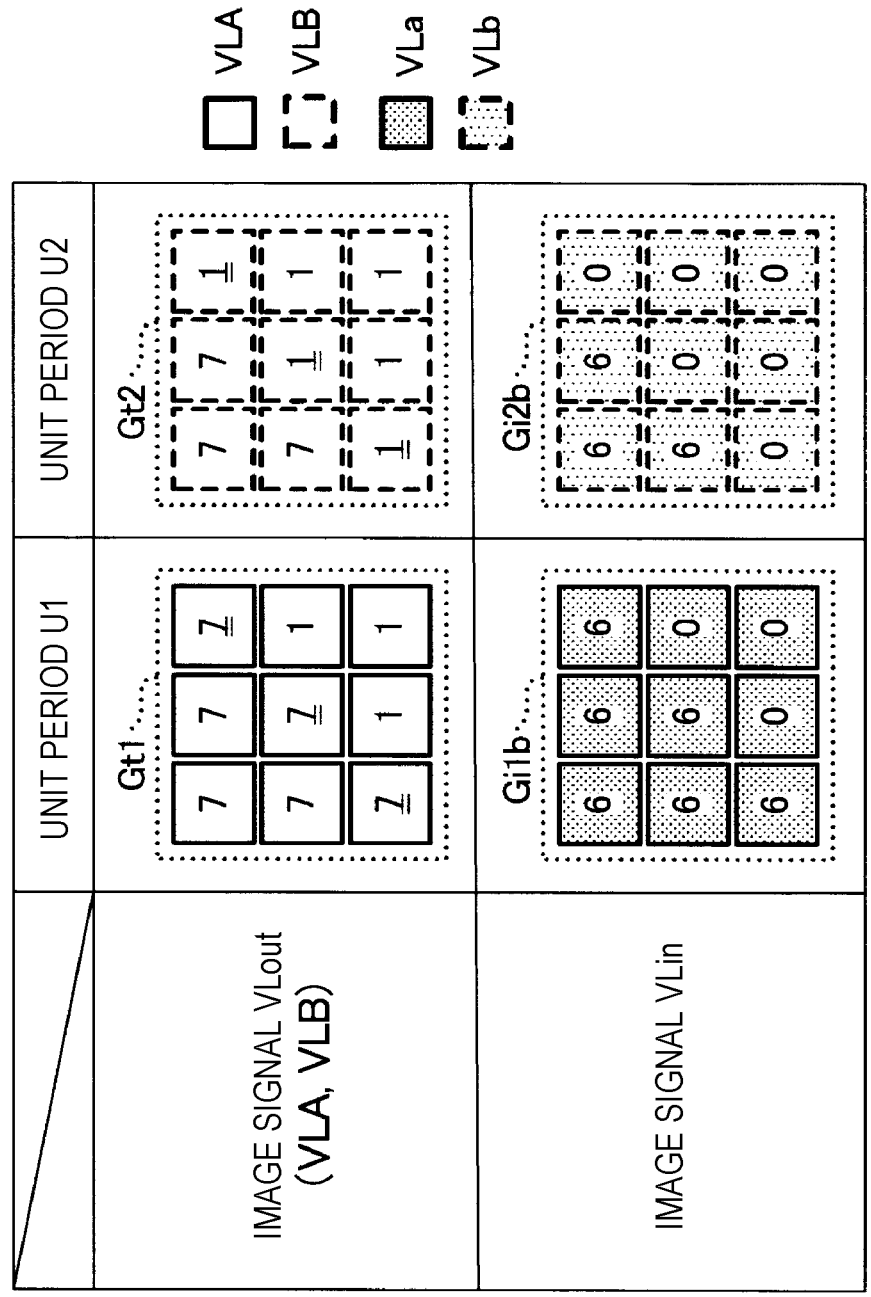
FIG. 23 is a diagram for explaining an image signal VLout and an image signal VLin according to the comparative example.

FIG. 23 is a diagram illustrating a relationship between the nine image signals VLA (signal group Gt1) generated based on the gradation level displayed by the 36 desired pixels Pv included in the region AA, the nine image signals VLin (hereinafter, referred to as "signal group Gi1b") input to the designation signal generating unit 516b corresponding to the nine image signals VLA, the nine image signals VLB (signal group Gt2) generated based on the gradation level displayed by the 36 desired pixels Pv included in the region BB, and the nine image signals VLin (hereinafter, referred to as "signal group Gi2b") input to the designation signal generating unit 516b corresponding to the nine image signals VLB in a case where the image signal VC generated based on the video signal Vin input to the projector 1b according to the comparative example is the image signal VCH.

In the same manner as FIG. 14, also in FIG. 23, it is assumed that the gradation level Lvin displayed by the video signal Vin and the image signal VC input to the projector 1b according to the comparative example is the designation gradation level LvS1 (for example, "7") or the designation gradation level LvS2 (for example, "1") and the gradation level displayed by the image signal VLA and the image signal VLB is also the designation gradation level LvS1 or the designation gradation level LvS2.

As illustrated in FIG. 23, regarding the non-edge pixel PxH of which the gradation level Lv1 designated by the image signal VLA is the designation gradation level LvS1 and of which the gradation level Lv2 designated by the image signal VLB is the designation gradation level LvS1, the image signal VLin input to the designation signal generating unit 516b corresponding to the image signal VLA becomes the image signal VLa indicating the designation gradation level LvS3 and the image signal VLin input to the designation signal generating unit 516b corresponding to the image signal VLB becomes the image signal VLb indicating the designation gradation level LvS3. That is, the non-edge pixel PxH displays the designation gradation level LvS3 for the unit period U1 and displays the designation gradation level LvS3 for the unit period U2.

In addition, regarding the non-edge pixel PxH of which the gradation level Lv1 designated by the image signal VLA is the designation gradation level LvS2 and of which the gradation level Lv2 designated by the image signal VLB is the designation gradation level LvS2, the image signal VLin input to the designation signal generating unit 516b corresponding to the image signal VLA becomes the image signal VLa indicating the designation gradation level LvS4 and the image signal VLin input to the designation signal generating unit 516b corresponding to the image signal VLB becomes the image signal VLb indicating the designation gradation level LvS4. That is, the non-edge pixel PxH displays the designation gradation level LvS4 for the unit period U1 and displays the designation gradation level LvS4 for the unit period U2.

In this way, the plurality of the unit pixels Px included in the projector 1b according to the comparative example does not include the unit pixel PxA and the unit pixel PxB. That is, in the comparative example, the image signal VLa is used as the image signal VLin for the unit period U1 and the image signal VLb is used as the image signal VLin for the unit period U2 regardless whether the unit pixel Px is the edge pixel PxK or the non-edge pixel PxH. As a result, with reference to FIG. 22, both of the edge pixel PxK and the non-edge pixel PxH display the gradation level Lv3 for the unit period U1 and display the gradation level Lv4 for the unit period U2. In other words, the unit pixel Px included in the projector 1b according to the comparative example cannot display the gradation level (designation gradation level LvS1 and designation gradation level LvS2) of P bits (3 bits) represented by the input video signal Vin and can display only the gradation level of Q bits. That is, since the projector 1b according to the comparative example does not display the gradation level represented by the video signal Vin, an image quality of an image to be displayed by the projector 1b is decreased as compared with the projector 1 according to the embodiment described above.

1.4. Conclusion of Present Embodiment

As described above, in the projector 1 according to the present embodiment, the non-edge pixel PxH displays the gradation level expressible for the $2\alpha$ subfield periods sf (frame period F) and the edge pixel PxK displays the gradation level expressible for the $\alpha$ subfield periods sf (unit period U). On the other hand, in the projector 1b according to the comparative example, all of the unit pixels Px display the gradation level expressible for the $\alpha$ subfield periods sf (unit period U). For this reason, as compared with the comparative example, in the present embodiment, it is possible to suppress decrease of the number of the gradation levels expressible by the unit pixel Px. As a result, since the finer gradation levels are expressed, it is possible to suppress decrease of a gradation expression quality of the image (the image projected onto the projection surface 80) displayed by the projector 1 according to the present embodiment. In other words, according to the present embodiment, for the non-edge pixel PxH, it is possible to display the gradation level represented by the video signal Vin without decreasing the gradation. Accordingly, it is possible to improve both of pseudo improvement in resolution by the pixel shift process and high gradation expression.

In addition, in the present embodiment, the first designation information IF1 are the second designation information IF2 are stored in the separate lookup tables LT. The designation signal generating unit 516 generates the designation signal D by using one piece of the designation information IF with reference to the lookup table LT according to whether the unit pixel Px is the edge pixel PxK or the non-edge pixel PxH. Then, a process time for searching the SF code Cd of a reference target can be reduced as compared with a case the first designation information IF1 and the second designation information IF2 are stored the same lookup table LT and the designation signal generating unit 516 generates the designation signal D by using the first designation information IF1 and the second designation information IF2.

2. Modification Example

The embodiments can be variously modified. Specific modifications will be described below. The embodiments equal to or more than two arbitrarily selected from the following examples can be appropriately merged within a range not mutually contradictory. In the modification example described below, the same components as those in each of the embodiments are denoted by the same reference numerals and a description thereof will be appropriately omitted.

2.1. Modification Example 1

In the embodiment described above, the low resolution process of the image signal VCH described with reference to FIGS. 7 to 9 is used, but another low resolution process may be used. Specifically, in the embodiment, as an example, it is assumed that the gradation level represented by the desired pixel Pv having coordinates in which a value of x is minimum and a value of y is maximum among the four desired pixels Pv corresponding to the unit region UR in FIG. 8 is adopted as the gradation level (hereinafter, referred to as "gradation level corresponding to the unit region UR") designated by the image signal (VLA or VLB) corresponding to the unit region UR. Furthermore, as long as the gradation level is a gradation level determined based on the four gradation levels represented by the four desired pixels Pv corresponding to each of the unit regions UR, another gradation level different from the embodiment may be adopted as the gradation level corresponding to the unit region UR.

Figure 24:
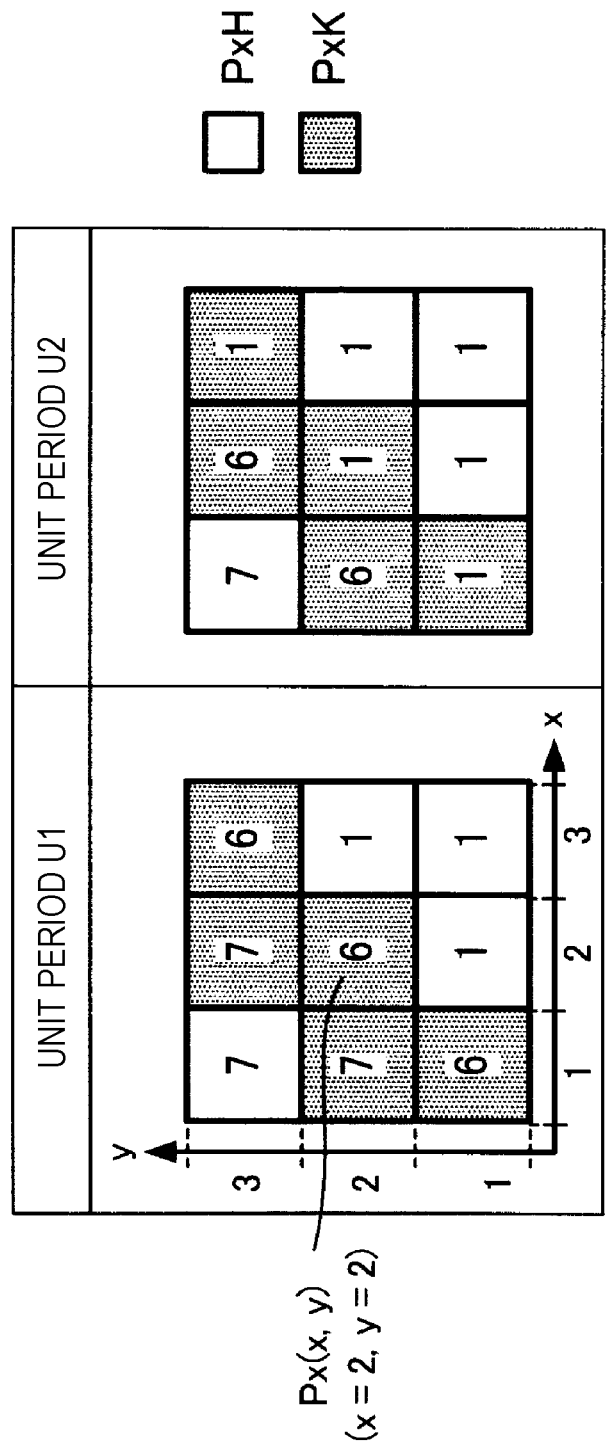
FIG. 24 is a diagram for explaining an example of a low resolution process according to a modification example.
Figure 25:
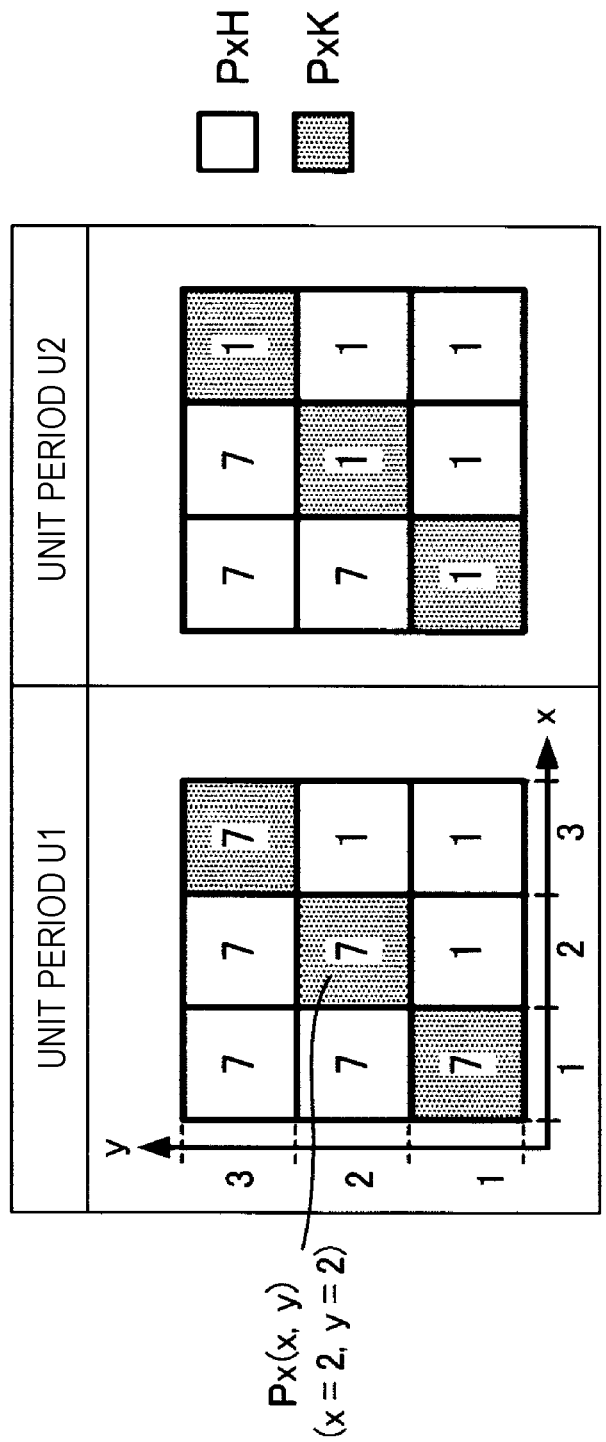
FIG. 25 is a diagram for explaining another example of the low resolution process according to the modification example.
Figure 26:
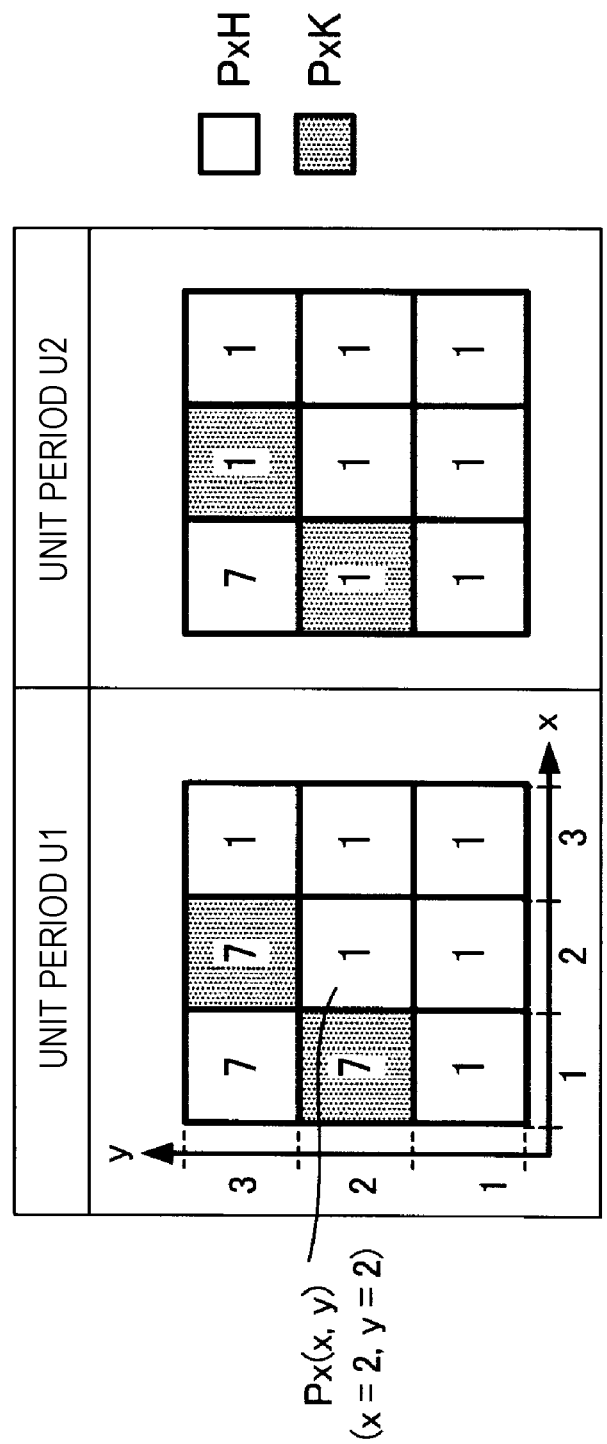
FIG. 26 is a diagram for explaining still another example of the low resolution process according to the modification example.

FIGS. 24 to 26 are diagrams for explaining examples of the low resolution process according to the modification example. Each of FIGS. 24 to 26 illustrates the example of the gradation level Lv1 to be displayed by the nine unit pixels Px corresponding to the nine unit regions URA of the region AA and the nine unit regions URB of the region BB for the unit period U1 and the gradation level Lv2 to be displayed by the nine unit pixels Px for the unit period U2. In FIGS. 24 to 26, in the same manner as the embodiment, for example, the unit region URAx (the unit region URA corresponding to the desired pixel Pva (3, 4), the desired pixel Pva (4, 4), the desired pixel Pva (3, 3), and the desired pixel Pva (4, 3)) in FIG. 8 will be described. As illustrated in FIG. 8, the four desired pixels Pv included in the unit region URAx represent the four gradation levels of "7", "7", "7", and "1".

In the present modification example, for example, as illustrated in FIG. 24, an average value of the four gradation levels corresponding to each of the unit regions UR in FIG. 8 may be adopted as the gradation level corresponding to the unit region UR. The unit region URAx in FIG. 8 corresponds to the unit pixel Px (2, 2) in FIG. 24. The average value of the gradation levels of "7", "7", "7", and "1" of the four desired pixels Pv corresponding to the unit region URAx illustrated in FIG. 8 is "6". Then, as illustrated in FIG. 24, the gradation level of "6" is adopted as the gradation level of the desired pixel Px (2, 2) in FIG. 24.

In addition, in the present modification example, as illustrated in FIG. 25, a maximum value of the four gradation levels corresponding to each of the unit regions UR in FIG. 8 may be adopted as the gradation level corresponding to the unit region UR. The maximum value of the gradation levels of the four desired pixels Pv corresponding to the unit region URAx illustrated in FIG. 8 is "7". Then, as illustrated in FIG. 25, the gradation level of "7" is adopted as the gradation level of the desired pixel Px (2, 2) in FIG. 25.

In addition, in the present modification example, as illustrated in FIG. 26, a minimum value of the four gradation levels corresponding to each of the unit regions UR in FIG. 8 may be adopted as the gradation level corresponding to the unit region UR. The minimum value of the gradation levels of the four desired pixels Pv corresponding to the unit region URAx illustrated in FIG. 8 is "1". Then, as illustrated in FIG. 26, the gradation level of "1" is adopted as the gradation level of the desired pixel Px (2, 2) in FIG. 26.

2.2. Modification Example 2

In the embodiment described above, the frame period F includes the two unit periods U. Furthermore, the frame period F may include the unit periods U equal to or more than three. In addition to the plurality of the unit periods U, the frame period F may include a reset period for which the unit pixel Px displays nothing (or the unit pixel Px is in the off-state).

In addition, in the pixel shift process according to the embodiment, a region onto which light is projected is moved in the +x direction and in the −y direction on the projection surface 80, but the invention is not limited thereto. The region onto which the light is projected may be moved, for example, in the −x direction and in the −y direction or in the −x direction and in the +y direction.

For example, it is assumed that the frame period F includes the four unit periods U (U1, U2, U3, and U4). In this configuration, by projecting light onto a region different from the unit period U on the projection surface 80, the projector 1 may perform the pixel shift process.

For example, the projector 1 may project light onto the unit region URA for the unit period U1, may project the light onto the unit region URC in which the unit region URA is moved in the +x direction for the unit period U2 succeeding the unit period U1, may project the light onto the unit region URD in which the unit region URC is moved in the −y direction for the unit period U3 succeeding the unit period U2, may project the light onto the unit region URE in which the unit region URD is moved in the −x direction for the unit period U4 succeeding the unit period U3, and then may project the light onto the unit region URA in which the unit region URE is moved in the +y direction.

2.3. Modification Example 3

In the embodiment, as an example, the case where the threshold value TH is "0" is described. Furthermore, the threshold value TH may be a value larger than "0." For example, the threshold value TH may be determined so that the threshold value TH is less than a value of the gradation level difference which can be visually seen by the user.

In addition, in the embodiment described above, in a case where a difference between the gradation level Lv1 and the gradation level Lv2 is equal to or less than the threshold value TH (NO in S4 in FIG. 12), the designation signal generating unit 516 generates the designation signal D which causes the unit pixel Px to display the gradation level Lv1 designated by the image signal VLA or the gradation level Lv2 designated by the image signal VLB for the frame period F. Furthermore, the invention is not limited to the embodiment. The designation signal D generated by the designation signal generating unit 516 in the case where the difference between the gradation level Lv1 and the gradation level Lv2 is equal to or less than the threshold value TH may cause the unit pixel Px to display the gradation level of P bits based on at least one of the gradation level Lv1 and the gradation level Lv2 for the frame period F. Here, the gradation level based on at least one of the gradation level Lv1 and the gradation level Lv2 is a gradation level (one example of "display gradation level" referred to as "gradation level LvM") included in a range defined by the gradation level Lv1 and the gradation level Lv2. The gradation level LvM of P bits included in the range defined by the gradation level Lv1 and the gradation level Lv2 is, for example, a gradation level which is equal to or higher than the lower gradation level and is equal to or lower than the higher gradation level among the gradation level Lv1 and the gradation level Lv2.

For example, it is assumed that the gradation level Lv1 is "7" and the gradation level Lv2 is "3". In this example, the gradation level LvM is a gradation level equal to or higher than the gradation level of "3" and equal to or lower than the gradation level of "7". Specifically, the gradation level LvM may be the gradation level of "5" which is an average value of the gradation level of "7" and the gradation level of "3", may be the gradation level of "6" weighted so as to be closer to the gradation level Lv1, or may be the gradation level of "4" weighted so as to be closer to the gradation level Lv2.

In addition, the gradation level LvM may be the gradation level of "3" which is a minimum value included in the range defined by the gradation level Lv1 and the gradation level Lv2 or may be the gradation level of "7" which is a maximum value.

Figure 27:
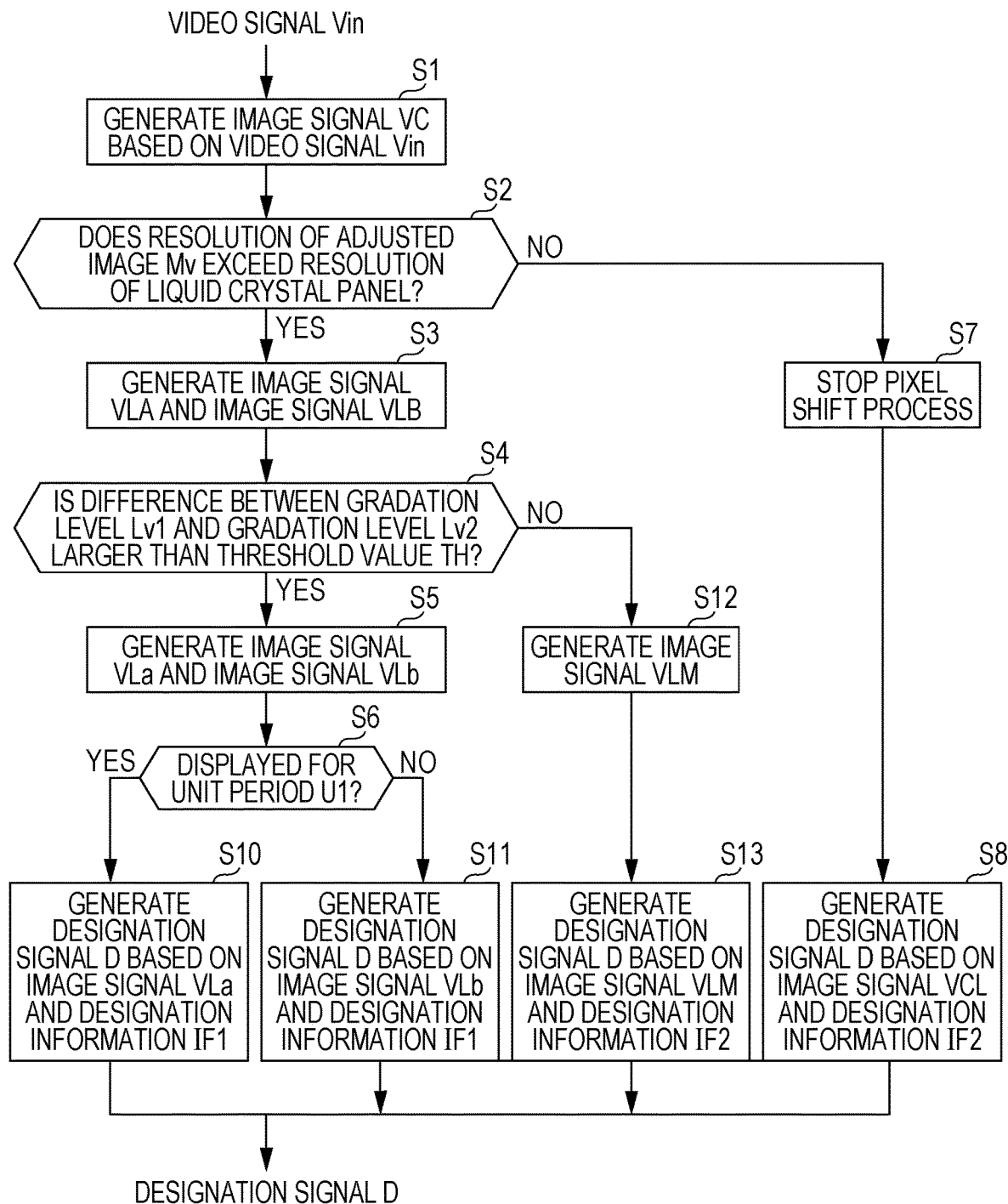
FIG. 27 is a flowchart for explaining a process of generating a designation signal according to the modification example.

Next, a flow of a process in the image processing unit 11 according to the present modification example will be described with reference to FIG. 27. A flowchart illustrated in FIG. 27 is the same as the flowchart illustrated in FIG. 12 except that in a case where the determination result is negative in step S4, steps S12 and S13 are executed instead of step S9.

In the case where the determination result is negative in step S4 (NO in S4), the gradation converting unit 515 generates an image signal VLM designating the gradation level LvM based on at least one of the image signal VLA designating the gradation level Lv1 and the image signal VLB designating the gradation level Lv2 (S12). The designation signal generating unit 516 generates the designation signal D based on the image signal VLM and the second designation information IF2 stored in the lookup table LT2 (S13). The designation signal D in this case is a signal which causes the unit pixel Px to display the gradation level LvM of P bits designated by the image signal VLM for the frame period F. In the present modification example, the process in step S12 is executed by the gradation converting unit 515, but the process may be executed by another configuration element other than the gradation converting unit 515 included in the image processing unit 11.

2.4. Modification Example 4

In the embodiment described above, the reference value TL is set to "0", but the reference value TL may be a value larger than "0".

2.5. Modification Example 5

In the embodiment and the modification example described above, the liquid crystal 43 is a VA type, but the liquid crystal 43 may be a twisted nematic (TN) type. That is, the projector 1 may be operated in a normally white mode in which the unit pixel Px displays white (relative transmittance of liquid crystal element CL is 100%) in a state in which the voltage is not applied between the pixel electrode 41 and the common electrode 42.

This application claims priority to Japan Patent Application No. 2017-121449 filed Jun. 21, 2017, the entire disclosures of which are hereby incorporated by reference in their entireties.

What is claimed is:

1. An electro-optical device comprising:
   an optical path shift element that changes an optical path of light so that a region which the light emitted via a pixel reaches for a first unit period including $\alpha$ subfields ($\alpha$ is a natural number satisfying $1 \leq \alpha$) is different from a region which the light reaches for a second unit period including $\alpha$ subfields;
   a determining unit that determines whether or not a difference between a first gradation level to be displayed by the pixel for the first unit period and a second gradation level to be displayed by the pixel for the second unit period is larger than a predetermined threshold value; and
   a designation signal generating unit that generates a designation signal designating an on-state or an off-state of the pixel for each of a plurality of the subfields,
   wherein in a case where a result of the determination is negative,
   the designation signal designates the on-state or the off-state of the pixel so that the pixel displays a display gradation level for the first unit period and the second unit period based on at least one of the first gradation level and the second gradation level, and
   each of the first gradation level, the second gradation level, and the display gradation level is a gradation level expressible by the on-state or the off-state of the pixel for each of the $2\alpha$ subfields, and
   wherein in a case where the result of the determination is positive,
   the designation signal designates the on-state or the off-state of the pixel so that the pixel displays a third gradation level determined based on the first gradation level for the first unit period and designates the on-state or the off-state of the pixel so that the pixel displays a fourth gradation level determined based on the second gradation level for the second unit period, and
   each of the third gradation level and the fourth gradation level is a gradation level expressible by the on-state or the off-state of the pixel for each of the $\alpha$ subfields.

2. The electro-optical device according to claim 1,
   wherein each of the first gradation level, the second gradation level, and the display gradation level is a gradation level of P bits (P is a natural number satisfying $2 \leq P$),
   each of the third gradation level and the fourth gradation level is a gradation level of Q bits (Q is a natural number satisfying $1 \leq Q < P$),
   in a case where the result of the determination is positive, the designation signal generating unit generates the designation signal by using first designation information designating the on-state or the off-state of the pixel for each of the $\alpha$ subfields when causing the pixel to display the gradation level of Q bits for the $\alpha$ subfields, and
   in a case where the result of the determination is negative, the designation signal generating unit generates the designation signal by using second designation information designating the on-state or the off-state of the pixel for each of the $2\alpha$ subfields when causing the pixel to display the gradation level of P bits for the $2\alpha$ subfields.

3. An electronic apparatus comprising:
   the electro-optical device according to claim 2.

4. The electro-optical device according to claim 1,
   wherein the first gradation level is designated by a first image signal and the second gradation level is designated by a second image signal, and
   the first image signal and the second image signal are signals obtained by decreasing resolution of a video signal representing the gradation level to be displayed by the pixel for a frame period including the first unit period and the second unit period.

5. An electronic apparatus comprising:
   the electro-optical device according to claim 4.

6. An electronic apparatus comprising:
   the electro-optical device according to claim 1.

* * * * *